United States Patent
Mazor

(10) Patent No.: US 11,301,927 B2
(45) Date of Patent: Apr. 12, 2022

(54) ART MARKET PRICING AND COMMISSION PLATFORM METHOD, NON-TRANSITORY MACHINE-READABLE MEDIUM, AND SYSTEM FOR USING THE SAME

(71) Applicant: William Mazor, Manhattan Beach, CA (US)

(72) Inventor: William Mazor, Manhattan Beach, CA (US)

(*) Notice: Subject to any disclaimer, the term of this patent is extended or adjusted under 35 U.S.C. 154(b) by 246 days.

(21) Appl. No.: 15/973,145

(22) Filed: May 7, 2018

(65) Prior Publication Data

US 2018/0330432 A1 Nov. 15, 2018

Related U.S. Application Data

(60) Provisional application No. 62/503,191, filed on May 8, 2017.

(51) Int. Cl.
*G06Q 30/00* (2012.01)
*G06Q 30/08* (2012.01)
(Continued)

(52) U.S. Cl.
CPC .............. *G06Q 30/08* (2013.01); *G06Q 20/12* (2013.01); *G06Q 30/0625* (2013.01);
(Continued)

(58) Field of Classification Search
CPC ..... G06Q 30/08; G06Q 30/0643; G06Q 20/12
(Continued)

(56) References Cited

U.S. PATENT DOCUMENTS

2008/0004977 A1* 1/2008 Fisher .................... G06Q 30/08
  705/26.3
2009/0328117 A1 12/2009 Morris et al.
(Continued)

FOREIGN PATENT DOCUMENTS

JP  2004-133864 A  4/2004
KR  10-1454445 B1  10/2014

OTHER PUBLICATIONS

Elkins, M. (2012). A critical account of the current paradigm for art gallery websites (Order No. 1514636). Available from ProQuest Dissertations & Theses Global. (1030952107). (Year: 2012).*
(Continued)

*Primary Examiner* — Michelle T Kringen
*Assistant Examiner* — Arielle E Weiner
(74) *Attorney, Agent, or Firm* — Womble Bond Dickinson (US) LLP

(57) ABSTRACT

An art market pricing and commission system for the fine art market is disclosed. The art market pricing and commission system allows artists and collectors to see how others are reacting to particular pieces of artwork in real time. The art market pricing and commission system creates an electronic ledger and official photographic record that authenticates works of art now and into the future. The art market pricing and commission system encourages individuals to participate in determining what is good and valuable and create a cohesive, thriving market. The art market pricing and commission system is deployed as an Internet platform that combines a specific pricing structure with a special commission system to incentivize user interaction, assign value to works of art and create a transparent, thriving market.

24 Claims, 16 Drawing Sheets

(51) Int. Cl.
*G06Q 30/06* (2012.01)
*H04L 67/55* (2022.01)
*G06Q 20/12* (2012.01)
*H04L 67/12* (2022.01)

(52) U.S. Cl.
CPC ......... *G06Q 30/0643* (2013.01); *H04L 67/12* (2013.01); *H04L 67/26* (2013.01)

(58) Field of Classification Search
USPC ........................................................ 705/26.3
See application file for complete search history.

(56) References Cited

U.S. PATENT DOCUMENTS

| | | | | |
|---|---|---|---|---|
| 2010/0223156 | A1* | 9/2010 | Shii | G06Q 30/0641 |
| | | | | 705/26.1 |
| 2012/0084661 | A1* | 4/2012 | Gil | G06F 3/0482 |
| | | | | 715/738 |
| 2012/0296677 | A1* | 11/2012 | Julka | G06Q 10/083 |
| | | | | 705/4 |
| 2014/0188606 | A1* | 7/2014 | Moore | G06Q 30/0251 |
| | | | | 705/14.53 |
| 2015/0142555 | A1* | 5/2015 | Zheng | H04L 67/20 |
| | | | | 705/14.43 |
| 2016/0330580 | A1* | 11/2016 | Navarro | G06Q 30/0641 |
| 2017/0287067 | A1* | 10/2017 | Gupta | G06Q 40/04 |
| 2017/0337621 | A1* | 11/2017 | Peters | G06F 21/10 |

OTHER PUBLICATIONS

Reference U Continued: Retrieved from https://www.proquest.com/dissertations-theses/critical-account-current-paradigm-art-gallery/docview/1030952107/se-2?accountid=14753 (Year: 2012).*

PCT/US2018/031605, International Search Report and Written Opinion, dated Sep. 28, 2018, (13 pages).

International Preliminary Report on Patentability for Application No. PCT/US2018/031605 dated Nov. 21, 2019, 8 pages.

* cited by examiner

ART MARKET PRICING AND COMMISSION PLATFORM METHOD, NON-TRANSITORY MACHINE-READABLE MEDIUM, AND SYSTEM FOR USING THE SAME

RELATED APPLICATION

The present application is a continuation of and claims the benefit of U.S. Provisional Patent Application No. 62/503,191, filed on May 8, 2017 and entitled "AN ART MARKET PRICING AND COMMISSION SYSTEM THAT INCENTIVIZES USER INTERACTION, ASSIGNS VALUES TO WORKS OF ART, AND PRODUCES A COHESIVE, THRIVING, AND TRANSPARENT ART MARKET", which is incorporated by reference in their entirety.

FIELD OF THE INVENTION

Embodiments of the invention relate generally to pricing and commission systems, and more particularly, to a pricing and commission platform for the fine art market that allows artists and collectors to see how others are reacting to particular pieces of artwork in real time, creates an electronic ledger and official photographic record that authenticates works of art now and into the future, encourages individuals to participate in determining what is good and valuable, and creates the impetus for a thriving, transparent market where the community members get to participate in the forming of a consensus of what is valuable.

BACKGROUND

The art market is fragmented between hundreds of auction houses and galleries around the world. To the benefit of dealers and the detriment of collectors, it is the last unregulated business on the planet. Lack of transparency in how business is conducted leads to conflict of interest, secret commissions and price fixing scandals. The current model benefits established art world names and creates enormous barriers to entry for new artists and collectors (typically, it's about who you know). Artists sometimes have trouble getting paid by gallery owners and have difficulty collecting royalties when their artwork goes up in value and is resold. Forgeries are common. Origins of authenticity are crucial to the art market. Purchasers want to know they are buying the genuine article but it has been proven difficult to week out fakes. A rarefied and impenetrable circle of established players—with a vested interest in controlling the market—determine what is good and valuable.

Other online art platforms are essentially extensions of the high end or low-end brick and mortar art market. Like retail sites for clothing and other goods, the value they offer is largely shopping convenience—being able to browse and purchase product from the comfort of one's home.

Currently, the art market is fragmented and unregulated with enormous barriers to entry for new artists and new collectors. A rarefied circle of art world elites—with an interest in controlling the market—determine what is good and valuable. This invention allows artists to see in real time how people are reacting to their work. Collectors have real time access to how others are reacting to works that they might be interested in acquiring. They don't have to rely on a gallery owner or an "expert", who may have an alchemist's motives, to tell them what is good and valuable. The price structure combined with the commission system creates the impetus for a thriving, transparent market where the community gets to participate in the forming of a consensus of what's valuable.

Therefore, what is needed is a way to allow artists to see in real-time how people are reacting to their art work and to give collectors real time access to how others are reacting to art works that they might be interested in acquiring by way of a special price structure and commission system that allows users to participate in determining what is good and valuable without relying on a gallery owner or an "expert" to tell them what is good and valuable.

SUMMARY OF THE INVENTION

An artwork marketplace platform and method for using the same are disclosed. In one embodiment, the method for operating an art auction platform comprises: streaming one or more feeds of images of a plurality of pieces of artwork to client machines of users of the platform for display on screens of the client machines; generating events in response to feedback received from the client machines, the feedback sent wirelessly from the client machines of the users viewing the one or more feeds, the feedback being generated in response to one or more gestures made with respect to the mobile devices that indicate user opinion with respect to individual pieces of artwork in the plurality of artwork, the events triggering generation of virtual galleries for the users; maintaining one or more virtual galleries for each user of images of artwork from the one or more feeds, each of the virtual galleries viewable by users of the platform on their client machine, each virtual gallery that is associated with each user containing images of artwork that said each user indicated that they liked while viewing the one or more feeds; receiving an indication from a first user wanting to bid on a first piece of artwork being viewed as part of a first virtual gallery in response to the user selecting a graphical user interface element on a display of one client machine displaying the first piece of artwork of the first virtual gallery; wirelessly sending, via a wireless communication network, an auction notification to each of a first set of client machines of users that have the first piece of artwork in at least one of their virtual galleries, the auction notification indicating an auction for the first piece of artwork is to occur; and performing an auction for the first piece of artwork via the wireless communication network, including receiving one or more messages containing bids transmitted from client machines in the first set of client machines, generating and pushing notifications regarding the auction, including bid information, to the first set of client machines, and concluding the auction, including transferring funds via electronic transfer to the user having the first virtual gallery if the auction concludes in a sale of the first piece of artwork due to the auction being started from the first virtual gallery.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
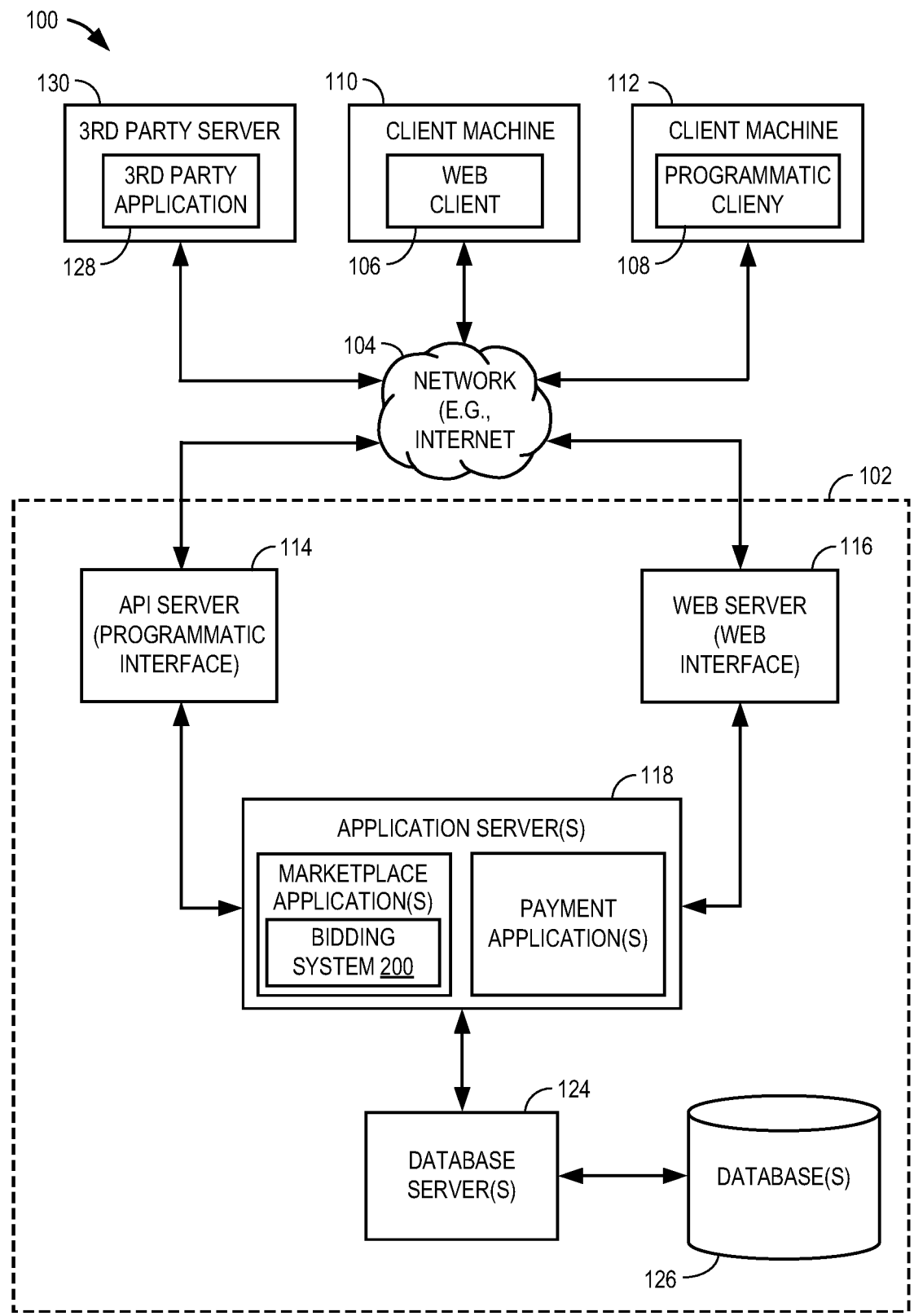
FIG. 1 illustrates a network diagram depicting a client-server system, within which one or more example embodiments may be deployed.

In the following detailed description of the invention, numerous details, examples, and embodiments of the invention are described. However, it will be clear and apparent to one skilled in the art that the invention is not limited to the embodiments set forth and that the invention can be adapted for any of several applications.

A novel art market pricing and commission platform for the fine art market is disclosed. In one embodiment, the art market pricing and commission platform sets up a marketplace to allow artists and collectors to see how others are reacting to particular pieces of artwork in real time. In one embodiment, the art market pricing and commission platform creates an electronic ledger and official photographic record that authenticates works of art now and into the future. In one embodiment, the art market pricing and commission system encourages individuals to participate in determining what is good and valuable and create a cohesive, thriving market. In some embodiments, the price structure combined with the commission system creates the impetus for a thriving, transparent market where the community gets to participate in the forming of a consensus of what is valuable.

As stated above, the art market is fragmented between hundreds of auction houses and galleries around the world. Art world elites benefit while new art collectors and artists suffer with the present art market conditions. A lack of transparency in how business is conducted leads to conflicts of interest, secret commissions, and price fixing scandals. The current model benefits established art world names and creates enormous barriers to entry for new artists and collectors. Artists sometimes have trouble getting paid by gallery owners and have difficulty collecting royalties when their artwork goes up in value and is resold. Forgeries are common. Origins of authenticity are crucial to the art market. Purchasers want to know they are buying the genuine article but it is difficult to weed out fakes. A rarefied and impenetrable circle of art world elites, with vested interests in controlling the market, determine what is good and valuable.

Embodiments of the art market pricing and commission platform described herein differ from and improve upon the currently existing conventional model for the art market. In particular, embodiments of the art market pricing and commission platform differ by allowing users to track how people are reacting to a particular piece of art in real time like a security (e.g., stocks or bonds). In one embodiment, the art market pricing and commission system is built to reflect how contemporary art goes up in value in the real world—doubling, tripling, quadrupling in value in shorter and shorter periods of time. In one embodiment, the commission system, rewarding each individual in a bidding chain a certain percentage (e.g., a commission equal to ten percent of the amount raised over the previous bid) upon a sale encourages speculation and the creation of thriving, transparent market. Site users get to participate in the forming of a consensus of what is good and valuable.

In addition, embodiments of the art market pricing and commission platform improve upon the currently existing conventional model of the art market because some of the existing sites act as online catalogs for the low-end art market. Anyone can post their work for sale and the user must sort through thousands and thousands of paintings with wildly varying degrees of aesthetic quality and prices that seem assigned in an arbitrary manner with little rhyme or reason to the process. There is little to no chance that the works posted on these sites will offer any investment return and for the artists who post on these sites there is little chance that they will see their prices rise significantly. Other sites act as an online catalog for the high-end art market. On these sites, the non-transparent works of the conventional model of the art market boosts artists who have been sanctioned by art world elites in the existing market as brand names and their prices have been set by the opaque inner workings of the conventional gallery system. Many offer the kind of "expert" advice and sales pitches one might encounter in an actual gallery experience, only online. Still others claim the noble goal of finding and promoting new talent but these sites are basically the equivalent of upstart galleries operating at the fringes of the established gallery system. The works displayed are by young or new artists and are chosen, priced, and promoted by an "expert". They do little to alter the status quo. Some sites allow bidding but much in the same way you might bid on a tennis racket or a pair of sunglasses. Bids go up in small increments until a sale is finalized. This is not a reflection of how works of art increase in value in the real world. In the real world they double, triple, quadruple in value in shorter and shorter periods of time. Other sites connect users to live auctions. These sites allow users to participate but again they are offering convenience rather than something new.

The embodiments of the art market pricing and commission platform facilitate auctions for artwork by setting up a framework that allows user's opinions of artwork to be captured in a convenient and quick manner to create a marketplace. The platform uses the captured information to enable easy tracking of artwork preferred by a user. The platform is able to maintain the collective opinions of users to enable various views or opinions of artwork to be located and accessible at one site to enable users to quickly obtain information that is needed for a marketplace to function efficiently, while enabling users to easily set up a network of other users to follow where the opinions of those users are considered worthy of consideration when making decisions in the marketplace. The platform also uses the tracking of artwork for users and the accessibility of information to support an auction framework that is designed to pull users that have indicated their preference for a piece of artwork into an auction instantly when an auction starts randomly where the auction uses a different commission structure to promote a more active marketplace for artwork.

As discussed above, embodiments of the art market pricing and commission platform facilitate auctions for artwork. As used herein, an "auction" is an online bidding system, between a seller that has one or more items for sale (e.g., artwork), and a potential buyer wishing to procure at least one of the items, hosted by an electronic marketplace. In one embodiment, the electronic marketplace allows users viewing pieces of artwork in a virtual gallery to initiate an auction. In one embodiment, each auction has a defined end time. All users of the platform that have the piece of artwork in their virtual gallery are notified and invited to participate in the auction. These users (e.g., the potential buyers) can participate in the auction by, for example, watching the auction or bidding in the auction. Also as used herein, the term "or" may be construed in either an inclusive or exclusive sense. Similarly, the term "exemplary" is construed merely to mean an example of something or an exemplar and not necessarily a preferred or ideal means of accomplishing a goal.

Furthermore, the bidding in these auctions occurs in real-time. As used herein, "real-time" is defined as substantially real-time where communication may not be strictly instantaneous due to time delays inherent in electronic communications. In one embodiment, a server may transmit a notification to a client machine that the auction is about to start or that it is about to end. The user, using the client machine, is able to subscribe to the auction. In response to the subscription, the server registers the client machine and establishes a connection. In one embodiment, the connection is implemented using a push technology, such as WebSockets. While the connection is open, the server manages bids received from other users and pushes the most recent bids to the client machine. The user, using the client machine, may submit a bid or a subsequent bid for the item to the server.

There are a number of events that occur in the auction process for which notifications may be generated. The events may include auction endings, new auction announcements, new feedback received, requests for feedback, shipment confirmations, payment confirmations, and the like. The platform manages these notifications.

In some instances, the systems and methods for real-time bidding may provide more efficient data communications than is currently available and may reduce network congestion caused by bids that do not exceed a previously submitted bid. Further, bandwidth and power may be preserved by only establishing a push connection when it is desirable to have one.

FIG. 1 is a network diagram depicting a client-server system 100, within which one or more example embodiments may be deployed. A networked system 102, in the example forms of a network-based artwork marketplace or publication system, provides server-side functionality, via a network 104 (e.g., the Internet or Wide Area Network (WAN)) to one or more clients. FIG. 1 illustrates, for example, a web client 106 (e.g., a browser, such as the Internet Explorer® browser developed by Microsoft® Corporation of Redmond, Wash.), and a programmatic client 108 executing on respective client machines 110 and 112. Client machines 110 and 112 may comprise a cellular telephone, a handheld or other mobile device such as a smartphone, a personal computer (PC), a tablet PC, a set-top box (STB), a Personal Digital Assistant (PDA), or any machine capable of executing a set of instructions (sequential or otherwise) that specify actions to be taken by that machine.

An Application Program Interface (API) server 114 and a web server 116 are coupled to, and provide programmatic and web interfaces respectively to, one or more application servers 118. The application servers 118 host one or more artwork marketplace applications 120 and payment applications 122. The application servers 118 are, in turn, shown to be coupled to one or more database servers 124 that facilitate access to one or more databases 126.

The artwork marketplace applications 120 may provide a number of marketplace functions and services to users that access the networked system 102, including a bidding system 200, as described in detail below. In one embodiment, the payment applications 122 likewise provide a number of payment services and functions to users. In one embodiment, the payment applications 122 allow users to accumulate value (e.g., in a commercial currency, such as the U.S. dollar, or a proprietary currency, such as "points") in accounts, and then later to redeem the accumulated value for products (e.g., goods or services) that are made available via the artwork marketplace applications 120. While the artwork marketplace 120 and payment applications 122 are shown in FIG. 1 to both form part of the networked system 102, it will be appreciated that, in alternative embodiments, the payment applications 122 may form part of a payment service that is separate and distinct from the networked system 102.

Further, while the client-server system 100 shown in FIG. 1 employs a client-server architecture, the present invention is of course not limited to such an architecture, and could equally well find application in a distributed, or peer-to-peer, architecture system, for example. The various marketplace 120 and payment applications 122 could also be implemented as standalone software programs, which do not necessarily have networking capabilities.

The web client 106 accesses the various artwork marketplace 120 and payment applications 122 via the web interface supported by the web server 116. Similarly, the programmatic client 108 accesses the various services and functions provided by the artwork marketplace 120 and payment applications 122 via the programmatic interface provided by the API server 114. The programmatic client 108 may, for example, be a seller application to enable sellers to sell artwork on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace or payment functions that are supported by the relevant applications of the networked system 102.

The bidding system 200, along with its various components, may be implemented as hardware or software. The bidding system 200, as shown in FIG. 1, may form part of the marketplace applications 120. However, it is understood that the bidding system 200 may be implemented separate from the marketplace applications 120 or the application servers 118. For example, the bidding system 200 may be implemented as part of the third party application 128 residing on the third party server machine 130. The example of the bidding system 200 comprises a notification module, a subscription module, and an event filter.

In one embodiment, the notification module is configured to receive or access a selection of an auction from a user and to send notifications to the user about the auction, including that an auction for artwork is to begin, bids occurring in the auction, that an auction regarding a piece of artwork is going to end at a particular time. Sometime during an auction, for example, days before the auction ends, the user may select the auction as an auction that the user desires to participate in by, for example, bidding in the auction, or requesting that an alert be sent before the auction ends.

In one embodiment, the notification module manages notifications sent in other contexts. For example, the notifications described herein may be sent based on stored feedback related to a piece of artwork, such as, for example, a title or description, a particular artist (seller), saved search, or the like. A notification based on an outstanding action item may include, for example, a reminder to send payment, provide feedback, ship sold item, or the like. A notification based on a confirmation may include, for example, that an item shipped, a payment was received, feedback was received, or the like.

The notification module then generates and transmits a notification to the client machine. For notifications based on a selected auction, the notification may be sent a predefined time (e.g., after a user selects a bid graphical user interface (GUI) element associated with a piece of artwork in a virtual gallery being viewed by the user). Notifications based on an action item or a confirmation may be sent based on when the triggering events occur. In some instances, the notification module may delay sending notifications according to pre-defined rules. For example, a user may select to have notifications delivered at specified times or at pre-determined intervals.

The notifications may include a predetermined expiration, when the notifications are no longer accessible to the user. For example, a notification based on an auction being selected may expire automatically when the auction ends (either at an initially predefined end time or, for example, in a hybrid auction where a seller chooses to "Buy it Now"). Other notifications may expire according to a user preference or predefined rules associated with the particular notification.

The subscription module 204 is configured to receive a subscription request from a user in response to a notification, register the client, and establish a connection to the client machine operated by the user. The notification processed by the subscription module 204 is typically a notification that an end of an auction is imminent, however, it is understood that the subscription module 204 may establish a connection based on other types of notification such as those based on action items.

The subscription module receives the subscription to an auction from a client machine, registers the client machine, and establishes the connection to the client machine. The connection includes electronic communication between the client machine and the bidding system 200. The registration and the established connection may be implemented according to one or more types of push technologies. Push technologies are a style of Internet-based or wireless-communication-based communication where the request for a given transaction is initiated by a publisher or central server (e.g., the bidding system 200 residing on the application server 118 or the third party server machine 130). Some examples of push technology include messaging service, Simple Mail Transfer Protocol (SMTP), Apple Push Notification Service, Hypertext Transfer Protocol (HTTP) Streaming, Bidirectional-streams Over Synchronous HTTP (BOSH), JAVA® Pushlet, Long Polling (e.g., Comet programming), Comet, Extensible Messaging and Presence Protocol (XMPP), Push Access Protocol, Push e-mail, Reverse Ajax, streaming media, and Web Sockets®.

The subscription module may terminate the connection when the auction ends or at some other suitable time. If a connection is lost before the end of the auction, the subscription module may automatically attempt to re-establish the connection with the client machine.

The event filter is active while a connection is active between the bidding system 200 and the client machine. The event filter manages events received from other clients and determines which events to push to the user via the connection. The filtered events may comprise notifications generated based on bids in the selected auction. In some instances, all bids except the highest submitted bid are filtered from the user. Other notifications or confirmations may be at least temporarily delayed by the event filter until the subscribed-to auction is complete. Bids being received in auctions separately from the selected auction may also be filtered using the event filter.

Example Artwork Platform Operation

The art market pricing and commission platform disclosed herein comprises a number of elements. This list of possible constituent elements is intended to be exemplary only and it is not intended that this list be used to limit the art market pricing and commission platform to a limited set of elements. Persons having ordinary skill in the art relevant to the present disclosure may understand there to be equivalent elements that may be substituted within the present disclosure without changing the essential function or operation of the art market pricing and commission system.

1. Open the application 120 of the platform on a computing device (e.g., a smartphone, a tablet computing device, a desktop personal computer, etc.) with hardware (e.g., one or more processors, memory, display screen, etc.), software, and/or firmware to display an image of a painting (e.g., images of artwork pops up) and enable a user to indicate their opinion (e.g., like, dislike, etc.) of the artwork being viewed by performing a gesture with respect to the display screen (e.g., selecting a GUI element (e.g., button) with a finger or cursor, swiping right with a finger if the user likes the artwork and left if the user doesn't like the artwork, etc.). In response to performing the gesture, the gesture is recognized and an notification is generated and transmitted indicating the user's opinion with respect to the art for collection by the platform and updating by the platform of statistics (e.g., number of likes for a piece of artwork).

2. Artwork that a user indicates are "liked" is placed in at least one of the user's virtual galleries and can then be purchased or obtained for the user's own personal collection. In one embodiment, the user can purchase the piece of artwork through an auction initiated by selecting a GUI element (e.g., a bid button) being displayed with the artwork when the artwork is viewed in their virtual gallery or the virtual gallery of another user and/or artist. In one embodiment, platform users (e.g., users of the website) who participate in a bidding chain for a piece of artwork that is ultimately sold receive a commission.

3. In one embodiment, once a piece of artwork is in a site user's virtual gallery, it is possible to then gain access to the information regarding the piece of art. In one embodiment, this occurs by selecting it (e.g., clicking on a GUI element) on the display screen of the client machine. In one embodiment, the following information is displayed in response to its selection: (1) the number of times the piece has been viewed; (2) the number of virtual galleries that hold or have held the artwork tracked over time; (3) the name of the artist of the artwork; (4) other works posted by the artist on the platform; (5) the artist's sales history on platform; and (6) a complete bidding history of the artwork on platform.

4. If it is desired to acquire a piece of artwork that is in a virtual gallery, then an auction may be started by placing an opening bid the piece of artwork. Note that this could occur from one's virtual gallery or through the virtual gallery of another that is being viewed by a user.

5. In one embodiment, the platform functions within a strict pricing structure that is a more accurate reflection of how art increased in value in the high end art world. In one embodiment, the base level price for all works of art is $500. In one embodiment, a user places an ante to secure the right to buy the piece of artwork in a predetermined period of time. In one embodiment, the ante is one percent of the purchase price and the predetermined period of time is 24 hours (though the platform can use any predetermined period of time. If he is outbid and the piece of artwork sells, he receives a commission equal to a prespecified percentage (e.g., ten percent) of the amount he raised over the previous price. However, the user does not get his ante back. Note that other embodiments may employ other pricing structures.

6. In one embodiment, to bid on a piece of art, a percentage of the price is deposited (e.g., one percent of the asking price) for the right to buy it within 24 hours. Thus in any opening bid of an art work, one may only pay $5 for the right to buy a piece for $500. In one embodiment, the transfer of funds occurs electronically and is coordinated by payment applications 122 of FIG. 1.

7. In one embodiment, the platform is time sensitive in that every other person has a piece of artwork in their virtual gallery when an auction for it begins is sent an alert (notification) and is on the clock as to whether to buy (e.g., 24 hour clock). If someone else wants the painting, they must now put down $10 for the right to buy it at $1,000. The 24 hour clock restarts, and another alert goes out. This process can repeat with every new right to buy that is paid for.

8. In one embodiment, if at the end of 24 hours no one has outbid a user, the piece is users to own. In one embodiment, when a painting is sold, 80 percent of the final sales price goes to the artist and each person that was part of the bidding chain gets a commission equal to ten percent of the amount he raised over the previous price, and the user does not get his ante back. The money left over goes to the platform ownership entity.

9. If the user with the winning bid declines to commit to the full purchase price after 24 hours, then that user loses his one percent bid and the person at the price point below gets the right to buy the painting for 24 hours. If that person declines, he loses his one percent bid, and the process continues through all the bidders.

10. For example, if a person who bid for the right to buy a painting at $10,000 decides he doesn't want to purchase the painting, his $100 bid goes to the platform ownership entity. The person who bid for the right to buy at $5,000 is now on the clock. If he declines to commit to full price, his $50 bid goes to the platform ownership entity and so on. If the individual who bid for the right to buy at $2,000 chooses to acquire the painting, then he must pay in full and the artist gets 80 percent and each person below him in the bidding chain gets a commission equal to ten percent of the amount he raised over the previous price. The user does not get his ante back.

11. In on embodiment, if the artist does not wish to sell a work at a particular price point, the artist has the option to place a bid at the next price point and this will now be the new starting bid for the work. For example, if a piece of artwork is bought for $2,000 but the artist does not wish to sell at that price he can pay $50 to set the price at $5,000 where it remains. In such a scenario, every person in the bid chain receives their money back.

12. When a piece of artwork is acquired, the artist ships it to the platform ownership entity where it is photographed and authenticated for the record, and then the piece is shipped to the buyer. In another embodiment, the artist ships it to the new owner. Also, in one embodiment, the digital image disappears from all site user's virtual galleries and is replaced by a ghost image. The digital image then appears in the new owner's "Collection". If a platform user clicks on, or other wise selects, the ghost image, he is directed to the new owner's collection.

13. Note that in one embodiment, a purchased work does not disappear from public view and essentially never goes off the market. For example, anytime an individual buys a piece of artwork on the platform, the artwork appears in the site user's "collection" with the last price point at which it sold. If at any time anyone else wants to acquire the work at the next price point, they can make a bid, which the platform receives and causes an event to occur; in response to the event, the platform generates and transmits an alert (notification) to the owner. In response to receipt, the owner can indicate their acceptance or non-acceptance via a message back to the platform. If the owner declines, the potential buyer gets his one percent bid back; if the owner accepts, the bidding process is reopened. When the bidding process is reopened, the platform sends alerts out to every individual who has the ghost image of the artwork in their virtual gallery and the process continues as discussed above.

14. In one embodiment, if and when a sale is finalized, the owner is paid 70 percent of the final sale price, the artist is paid 10 percent, and each person in the bidding chain is paid a ten percent commission at their price point and the rest goes to the platform ownership entity.

The various elements of the art market pricing and commission platform disclosed herein may be related in the following exemplary fashion. It is not intended to limit the scope or nature of the relationships between the various elements and the following examples are presented as illustrative examples only.

In one embodiment, the art market pricing and commission platform sets up a marketplace by presenting pieces of artwork to platform users on their client devices (e.g., mobile devices) and collects their opinion with respect to those pieces of artwork. In one embodiment, the pieces of artwork are streamed to the users as part of one or more feeds. The users can evaluate each piece of artwork that is viewed and provide their opinion as to that piece of artwork. In one embodiment, the users indicate their opinion my making one or more gestures with respect to the display of their client device. In one embodiment, the gestures include performing a swipe movement in one of two directions. For example, if the user performs a swipe left gesture, then the user's opinion is that the user is passing (or dislikes) the piece of art; if the user performs a swipe right gesture, then the user's opinion is that the user likes the piece of art. Note that other gestures may be used or selectable GUI elements may be included on the display by which a user can indicate their opinion. The client device captures the gesture information in a manner well-known in the art and generates a message to the platform containing an indication of the user's opinion. Alternatively, the gesture information is captured by the display and sent to the platform, which analyzes the gesture information to determine the user's opinion.

Note that the initial swipe right or left (gesture) may only be a pure gut decision by the platform user based solely on the image itself. No other information is available at this point—no dealer or expert telling you what is good or valuable, no famous name. This allows artists to see in real-time how people are reacting to their work, while allowing collectors to see how people are reacting to works that they may be interested in acquiring.

When an individual indicates that he likes a painting, the platform places a copy of artwork into the user's virtual gallery. An example of this is described in step 3 above. From the virtual gallery, a user can obtain additional information about the artwork and decide if he wants to place a bid on the artwork.

In one embodiment, the bidding process uses a strict pricing structure that reflects how contemporary art goes up in value in the high end art world, while employing a commission system to incentivize users to speculate on particular works, drive up prices, and create a transparent, vibrant marketplace. An example of the bidding process is described above in (steps 4-10. In one embodiment, if an artist does not want to sell his artwork at a particular price point, the artist can place a bid at the next price point and that will set a new price for the work (step 11). When a work is sold, it is shipped to the to the new owner. In one embodiment, works sold on the platform ownership entity appear in the buyer's "collection" (like a kind of trophy case) and never go off the market (steps 13-14) because another person viewing the art in a virtual gallery (or the owner's gallery) is always able to initiate an auction and place a bid on the art. Overall, a transparent, cohesive marketplace is created where the community gets to participate in the forming of a consensus of as to what artwork good and valuable.

In one embodiment, the art market pricing and commission platform generally works by the initial swipe left or right is based solely on the image of the artwork. No other information is given. This method is intended to capture an individual's gut reaction to a work of art and will allow artists to see how people are reacting to their work in real time and allow collectors to see how people are reacting to work they may want to acquire. Once a work is placed into their virtual gallery, an individual can find out more information about it. For example, in one embodiment, a user can obtain information about the percentage of likes/passes, name of the artist, sales history, etc., before deciding if he wants to make a bid. In one embodiment, the pricing structure reflects how art prices go up in the real world—not in small increments but rather doubling, tripling, quadrupling in shorter and shorter periods of time. It also allows for the commission system—where each person in a bidding chain is paid in one embodiment a commission equal to ten percent of the amount raised over the previous bid—to be viable. The more an individual user swipes right and left, the higher they go up in rank. In one embodiment, the ranking is depicted on client devices as a karate belt. For example, 1,000 swipes earns a white belt; 2,000 a yellow belt; 5,000 an orange belt; 10,000 a green belt; 25,000 a blue belt, 50,000 a purple belt; 100,000 a brown belt; 250,000 a red belt; 500,000 a black belt; 1,000,000 a Ninja; and 2,000,000 a Jedi Master). The "karate belt" ranking system based on number of swipes is optional but would further incentivize participation. A person skilled in the relevant art would appreciate that there are many other ways that a ranking system could be designed for the number of swipes each individual makes. Note that other indications may be used to indicate a user's ranking and/or the number of pieces of art reviewed by a platform user.

The pricing structure and the commission of one embodiment of the platform work together to incentivize participation, drive up prices, and create a vibrant, cohesive and transparent market where site users get to participate in the forming of a consensus of what's good and valuable.

Figure 2:
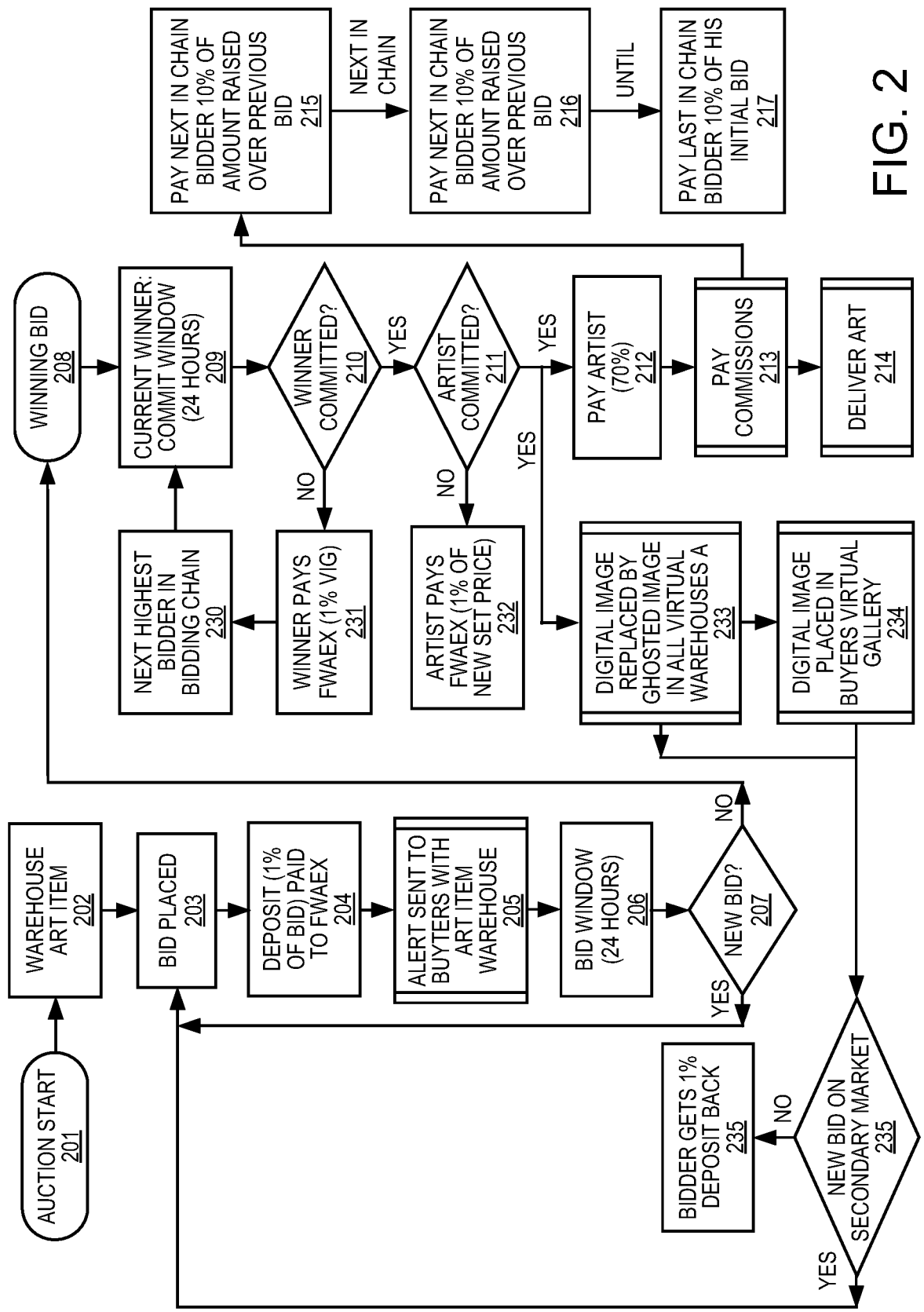
FIG. 2 is a flow diagram of one embodiment of pricing and commission process of the art market pricing and commission platform.

FIG. 2 is a flow diagram of one embodiment of pricing and commission process of the art market pricing and commission platform. The process is performed by processing logic that may comprise hardware (e.g., circuitry, dedicated logic, etc.), software (e.g., applications such as is executed on a general-purpose processor or dedicated machine), firmware, or a combination of the three.

Referring to FIG. 2, an auction starts (201) with a piece of artwork that is warehoused in a virtual gallery being displayed to a user (processing block 202). While viewing the artwork, the user places a bid (processing block 203). In one embodiment, this is performed by the user selecting a GUI element on the display (e.g., clicking on a bid button), which causes a notification (message) to be transmitted from the user's client machine and received by the art marketplace application of the platform.

In response to receiving the bid notification, the platform generates an event. The event causes a marketplace application in cooperation with the payment application of the platform to initiate an electronic funds transfer over the network to cause a deposit to be paid to the platform (processing block 204). In one embodiment, the deposit is a percentage of the bid (e.g., 1% of the bid).

The event also causes a marketplace application of the platform to generate and transmit alerts (notification messages) to all other platform users that have the piece of art warehoused in their virtual gallery (processing block 205). This notifies these users that an auction is starting for the piece of artwork. At this point, the platform sets up a bid window for a predetermined period of time (e.g., 24 hours) in which another bid may be made on the piece of art (processing block 206).

Processing logic of the platform checks whether another bid occurs (processing block 207). During this time, the platform may receive and generate a number of messages (e.g., notifications, alerts, etc.). If a higher bid is made by another user, then the process transitions back to processing block 203 and repeats from the time in the flow where a user made a bid. If no higher bid is made by another user, the process transitions to processing block 208 where the bidder is identified as a winner.

In response to a winning bidder being identified, the platform identifies the winning bidder and sets up an event that sets up a period of time during which the winning bidder can indicate a commitment to purchase the artwork at the price of the bid (processing block 209). In one embodiment, the period of time is 24 hours; however, the platform can be configured to use periods of time of any length.

In one embodiment, the winning bidder indicates a commitment to purchase the artwork using a GUI element on the display. In one embodiment, the GUI element is a button on the display of the client device, which when selected by the user, causes a notification to be sent to the platform.

The platform checks whether it has received an indication that the user is committed to purchasing the artwork during the predetermined period of time (processing block 210). If a notification from the winning bidder is not received during the specified time, the process transitions to processing block 231 where the winning bidder pays the platform a predetermined amount. In one embodiment, predetermined amount is a percentage of their winning bid (e.g., 1% of the winning bid). Note in alternative embodiments other amounts may be assessed against a winning bidder that does not complete a purchase (e.g., a percentage of their initial bid, etc.). In one embodiment, the platform using a payment application of the platform to complete an electronic funds transfer to obtain the predetermined amount from the user that is not completing the purchase.

If the winning bidder does not provide the indication of a commitment to purchase during the specified time period, the process transitions to processing block 230 where the platform designates the next highest bidder in the bidding chain as the winning bidder and then the process returns to processing block 209.

If the platform receives an indication (e.g., notification message) from the winning bidder indicating a commitment to purchase the artwork, the artist (or owner if the artist no longer owns the artwork) is notified and the platform checks whether the artist indicates a commitment to sell the artwork (processing block 211). If the artist sends a notification message indicating they do not wish to sell the artwork, the process transitions to processing block 232 where the artist pays the platform a predetermined amount and the auction ends. In one embodiment, predetermined amount is a percentage of the new price at which they are willing to sell the artwork. In one embodiment, the predetermined amount is 1% of the new sale price. Note in alternative embodiments other amounts may be assessed against the artist that does not complete a purchase (e.g., a percentage of the artwork's perceived value, etc.). In one embodiment, the platform using a payment application of the platform to complete an electronic funds transfer to obtain the predetermined amount from the artist (or owner) that is not completing the purchase.

If the platform receives a notification indicating artist wishes to sell the artwork, the process transitions to processing block 212, the platform pays the artist (or owner) a commission (processing block 212), pays commissions to one or more bidders (processing block 213), and delivers the artwork to the buyer (processing block 214). In one embodiment, the platform using a payment application to complete an electronic funds transfer to pay the artist and bidder's commissions. In one embodiment, the platform pays the artist a percentage of the winning bid (e.g., 80% or another pre-specified percentage). With respect to paying the commissions to one or more bidders, the platform uses the payment applications to pay the next in the chain of bidders a percentage (e.g., 10% or another prespecified percentage) of the amount raised over the previous bid (processing block 215), pay the next in the chain of bidders after the previous bidder a percentage (e.g., 10% or another prespecified percentage) of the amount raised over the previous bid (processing block 216), and so on, until it pays the last in the chain of bidders after the previous bidder a percentage of the amount raised over the previous bid (e.g., 10% or another prespecified percentage) (processing block 217).

If the platform receives a notification indicating artist wishes to sell the artwork, the process also transitions to processing block 233, the platform also replaces the digital image of the artwork by a ghosted image in all the virtual galleries that contained the artwork and places a digital image of the artwork in the buyer's "virtual collection" gallery of artwork that the buyer owns (processing block 234). In an alternative embodiment, the platform places a digital image of the artwork in the buyer's "virtual collection".

Thereafter, the process transitions to processing block 235 where the platform checks whether there is a new bid for the artwork on the secondary market. If not, then the platform using the payment application to perform an electronic funds transfer to transfer the first bidder's original deposit back to them. If there is a new bid on the secondary market, then the process transitions to processing block 203 where the process repeats.

Thus, to use the art market pricing and commission platform described herein, a user accesses a network (e.g., Internet) platform via a client machine (e.g., a smartphone, a computer, a web-based device, etc.). By following the above steps, the pricing structure and commission system works to create a viable method that incentivizes participation and establishes a transparent and cohesive market.

Moreover, the platform provides other advantages over other marketplaces. With the network platform described herein, artists can see in real-time how people are reacting to their work and use the platform to sell their work. Artists would use the network platform to establish higher prices for the artwork. Collectors would use the network platform to see in real-time how people are reacting to artwork they may want to acquire and use the network platform to purchase art work. Collectors would also use the network platform to sell work they've purchased on the platform. Collectors would use the network platform to participate in bidding chains, push artwork to new price points and get paid commissions on artwork that is sold. No one is required to rely on experts for entry or advice. Platform users get to participate in forming a consensus of what's good and valuable. Collectors could use the platform to create their own "virtual galleries" and become "dealers" themselves without the hassles of operating a brick and mortar establishment.

Also, the art market pricing and commission platform produces a vibrant, cohesive, and transparent art market. The art market pricing and commission platform described herein can increase the value of an artist's work. The art market pricing and commission platform can increase the value of art work purchased by a collector. The art market pricing and commission platform knocks down barriers to entry for artists and collectors alike. The art market pricing and commission platform produces an electronic ledger than can be used to authenticate works of art now and into the future. The art market pricing and commission platform produces entertainment and grants entry into the grand game of producing and acquiring high end art.

An Example of User Interface Displays and Interactions

In one embodiment, a user makes use of the platform using their client machine. The client machine includes a display screen that displays a user interface. In one embodiment, the user interface includes a number of pages through which the user navigates. In one embodiment, the display screen shows a number of GUI elements (e.g., buttons) that may be selected by a user that takes them to one or more of the pages of the user interface.

Figure 3:
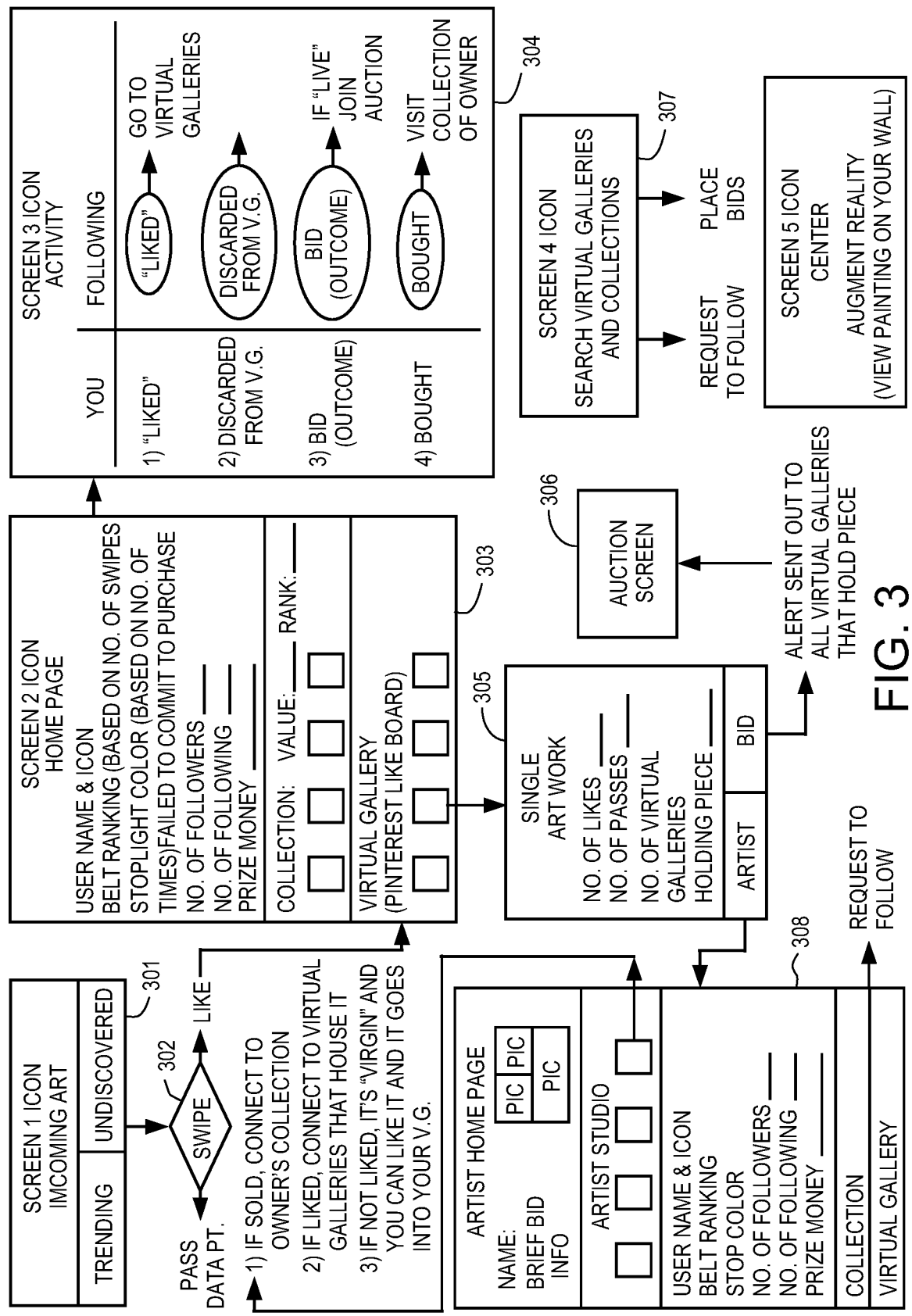
FIG. 3 illustrates a page flow consisting of a number of pages (e.g., web pages) in one embodiment of a client machine user interface.

FIG. 3 illustrates a page flow consisting of a number of pages (e.g., web pages) in one embodiment of a client machine user interface. Referring to FIG. 3, the pages includes an incoming art page 301 that is displayed and is used by the platform to stream flows of artwork to the users and collect their opinions (e.g., like, dislike, etc.) by receiving notification message from the user in response from the users performing one or more gestures with respect to the artwork being displayed. Page 303 illustrates an example of a user's home page depicting personal data, statistical data, collection data and images, as well as one or more virtual galleries. Page 304 illustrates an example of an activity page that allows a user to take certain actions. Page 307 is a search page allowing a user to search virtual galleries and collections of artwork. Page 309 is an augmented reality page that allows a user to visualize a piece of artwork on their wall or other location.

In one embodiment, the user interface also includes other pages such as an artist home page 308, which in one embodiment is similar to that the user but also includes artist specific information such as, for example, images of the artwork in their studio. Also, the user interface also includes pages, such as page 305, that depict information about a particular piece of artwork as well as auction pages, such as auction screen 306, setting forth auction information (e.g., bid amount(s), time limits, etc.) for an auction. In one embodiment, on the auction pages, an indication is displayed to indicate the number of times a user has failed to commit to the full purchase price. In one embodiment, the indication is in the form of a stoplight system (green, yellow, red) indicating the number of times the user has failed to commit to full purchase price. When a user commits to full purchase price, the platform reverts their stoplight color to green. After a predetermined number of times the user fails to commit to full purchase price, the platform changes the stop light color to yellow and then to red. In one embodiment, this stoplight system appears next to user icon during an auction and on the user home page.

In one embodiment, GUI elements (e.g., buttons) appear on all pages enabling the user to select a particular page and have the user interface directly go to and display the user interface page.

Examples of each of the pages above are described in more detail below.

Figure 4:
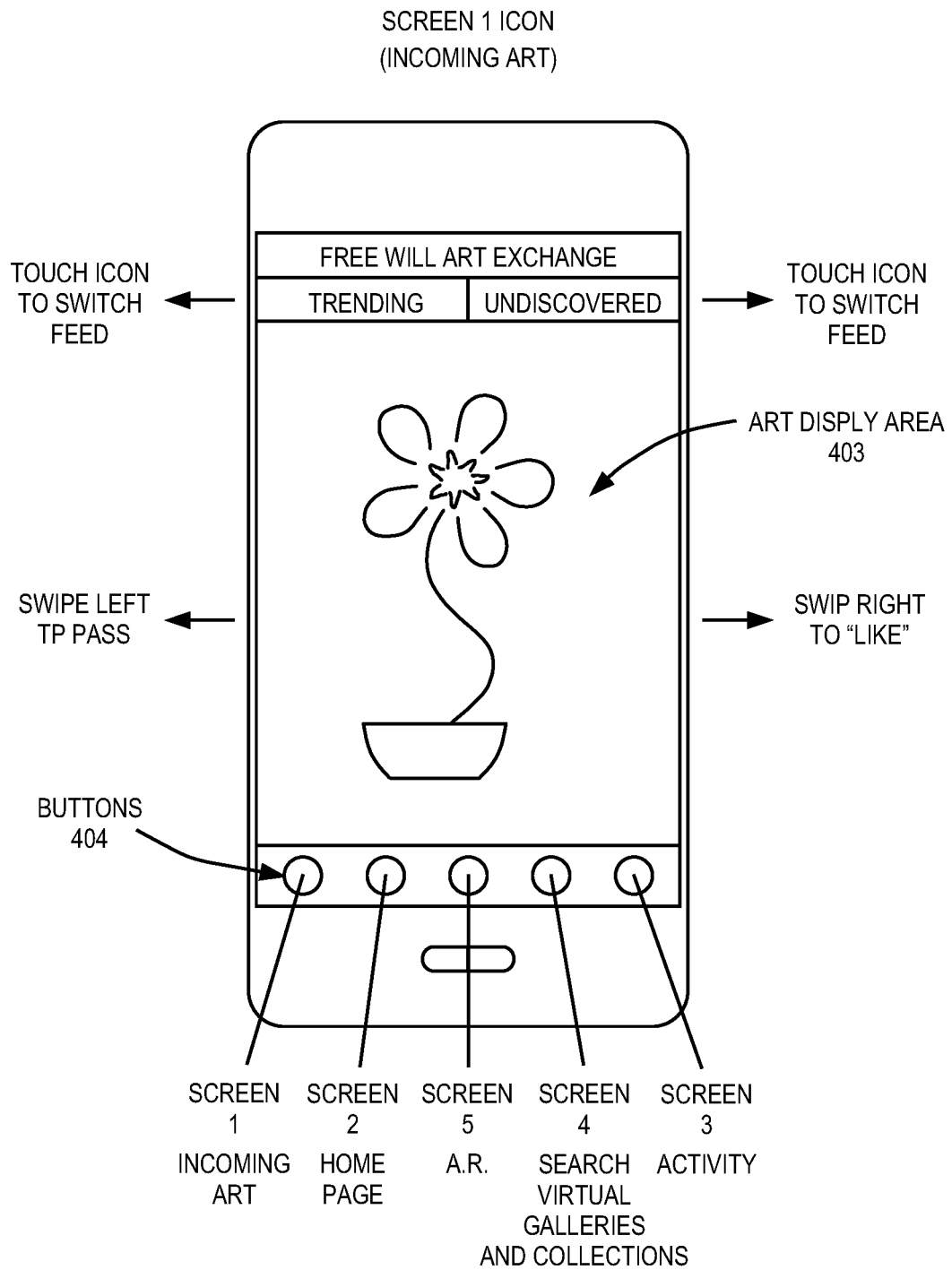
FIG. 4-10 illustrate examples of user interface pages for display on client machines.

FIG. 4 illustrates an example of an incoming art user interface page that is used to display artwork to a user that is streamed as part of one or more feeds from the platform. Referring to FIG. 4, in one embodiment, there are two feeds of artwork that can be streamed to the user. If a user selects GUI element 401, a feed of trending artwork is displayed one at a time to the user, while if a user selects GUI element 402, a feed of more obscure (e.g., undiscovered) artwork is displayed one at a time to the user. Note that the platform may stream other types of feeds or only a single feed of artwork in other embodiments. Each piece of artwork is displayed in art display area 403 of page 400.

For each piece of art, the user is provided an ability to indicate whether they like or don't like the art being displayed. In one embodiment, the user provides their indication by a swiping gesture. For example, in one embodiment, if the user swipes to the left, they indicate that they are passing on the art and do not care for it; if the user swipes to the right, they indicate that they like the art (see for example, swipe 302 of FIG. 3). Note that other gestures may be used, such as, for example, the user selecting a GUI element on the screen indicating their opinion. In response to the gesture, a notification message is sent from the client machine to the platform. In one embodiment, the client machine determines which gesture was made and includes it in the message along with the artwork associated with the gesture. In another embodiment, the client machine includes the gesture information in the message and the platform interprets the gesture information to determine the user's opinion with respect to the artwork.

In one embodiment, if the user indicates they like the artwork, the platform places a digital image of the artwork into the user's virtual gallery.

Note that page 400 also includes GUI buttons 404 to take the user directly to one of the pages of the user interface.

Figure 5A:
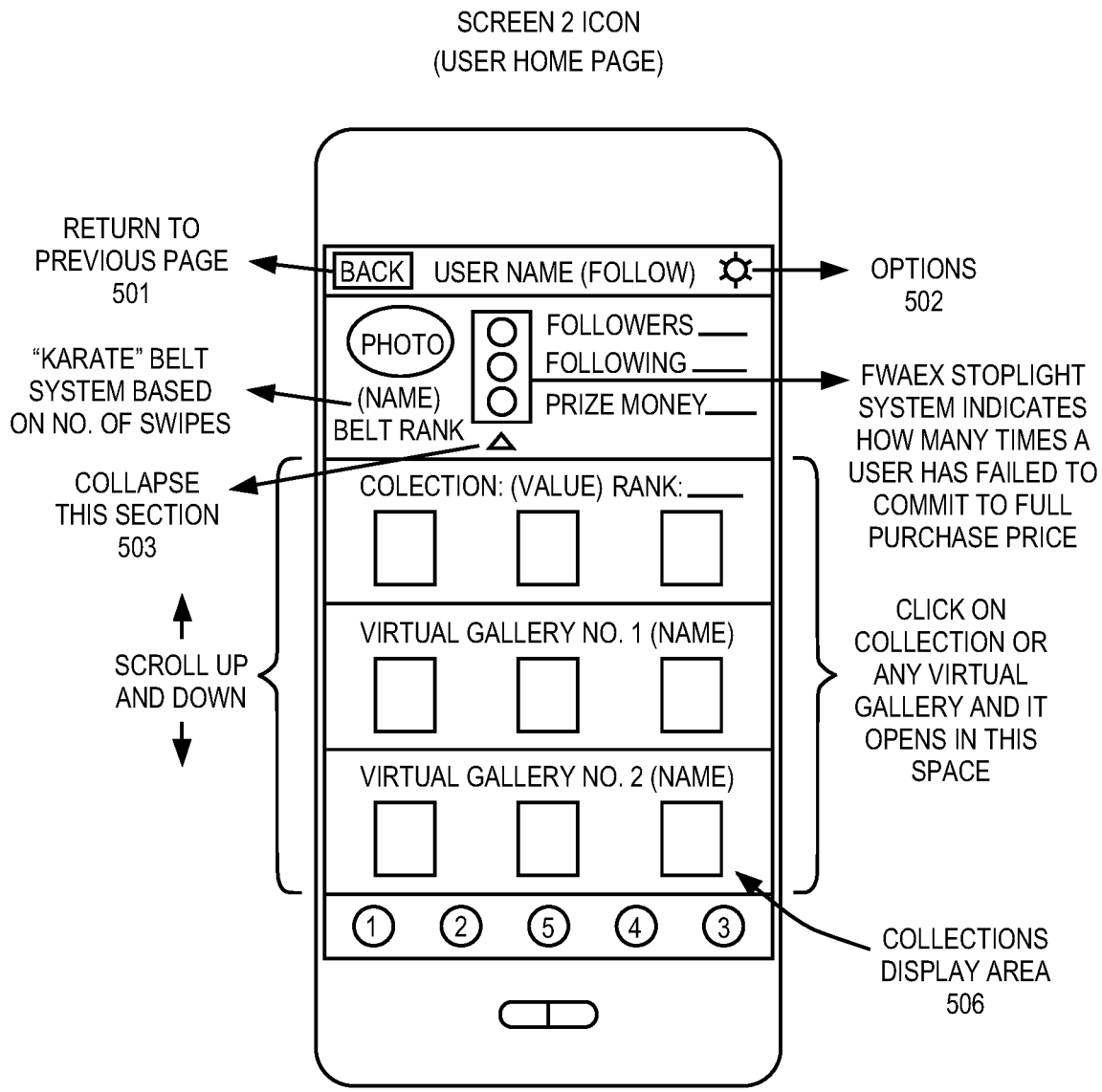
Figure 5B:
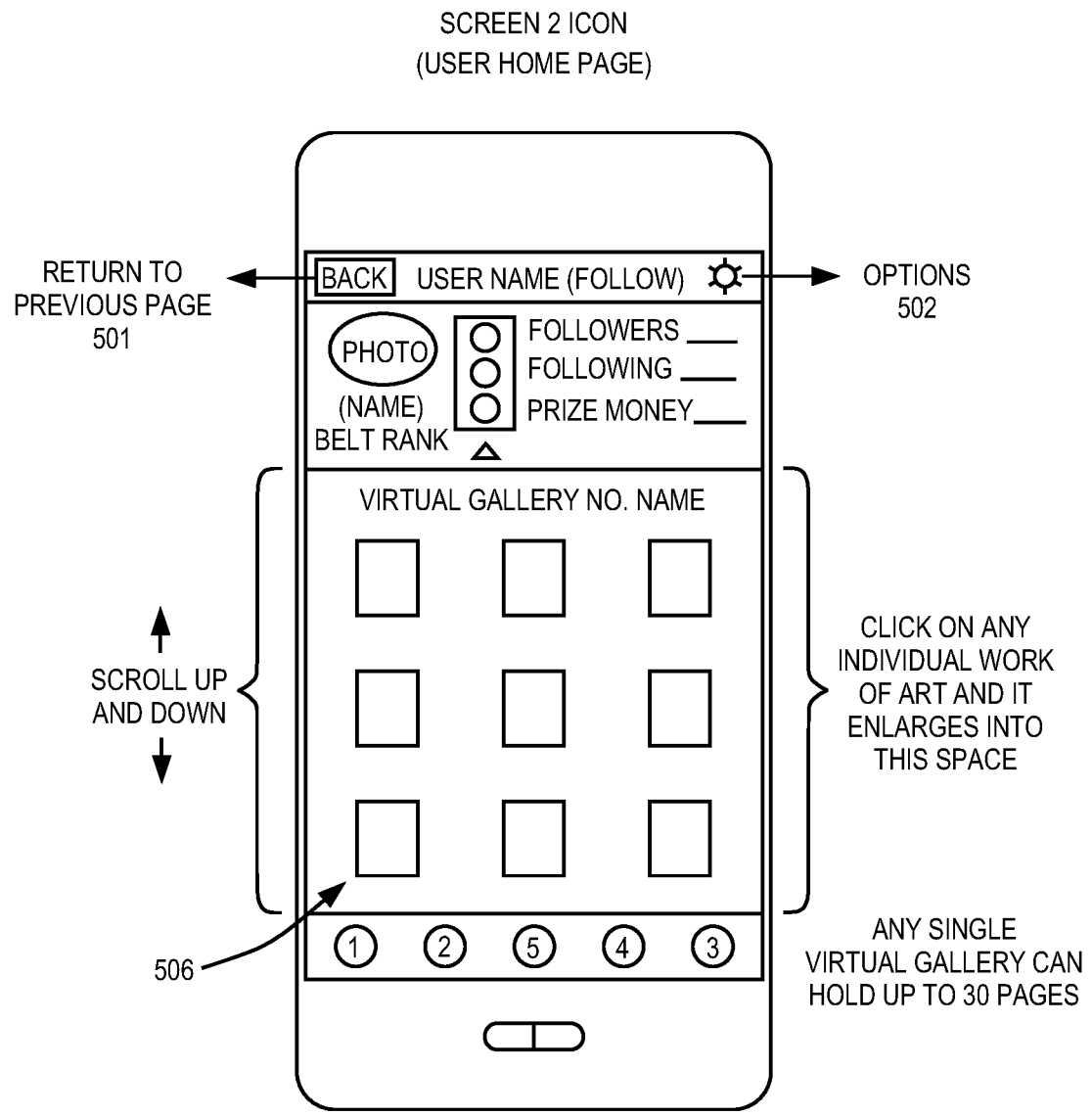
Figure 5C:
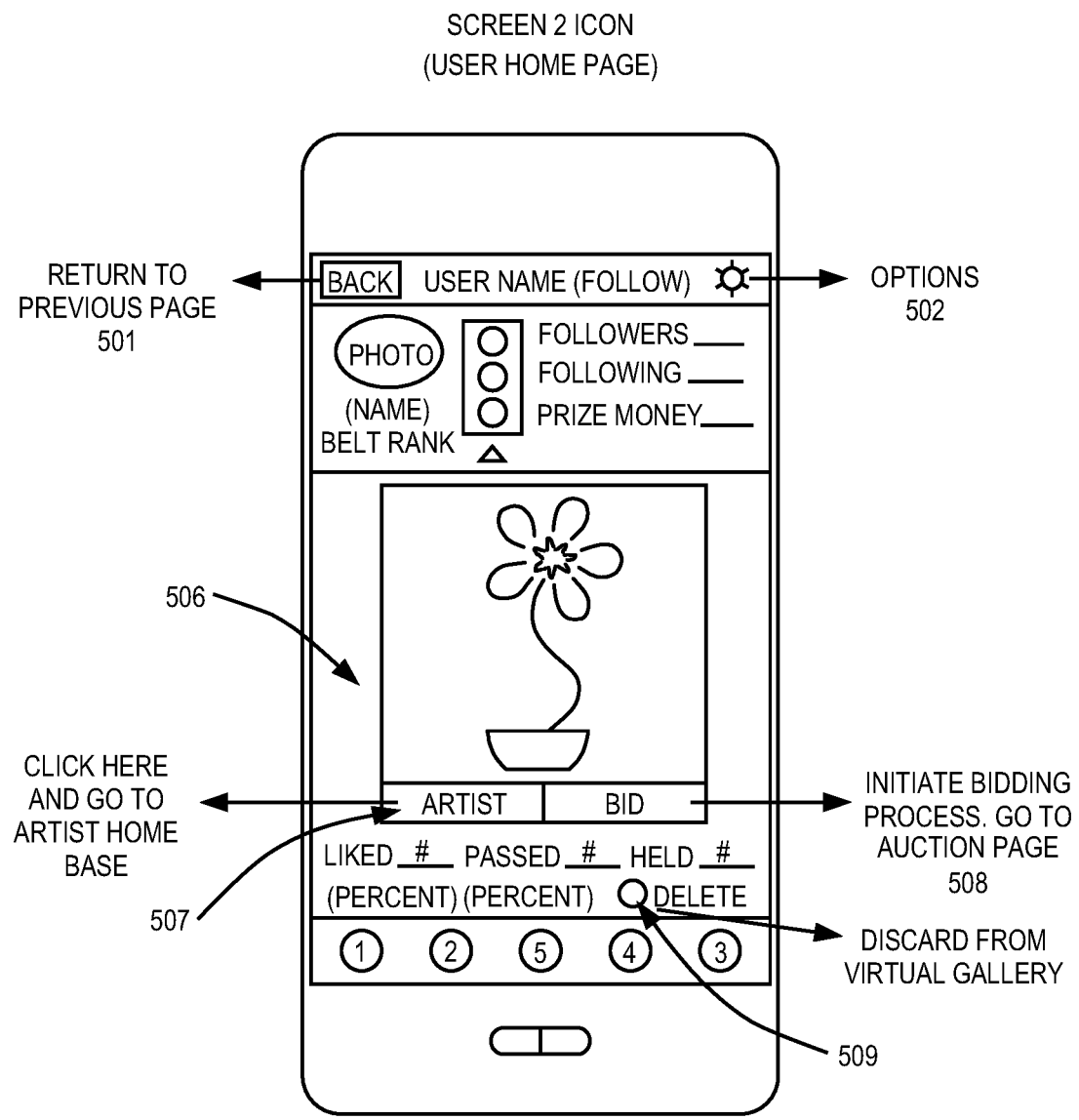

In response to the user selecting the home page button of buttons 400, the user is taken to their home page. FIG. 5A through 5C illustrate an example of a user home page. Referring to FIG. 5A, in one embodiment, the user's home page includes a button 501 that may be selected by the user to allow the user to return to the previous page. In one embodiment, the user's home page also includes an options button 502 that provides the user with a number of options. In one embodiment, the options include searching for galleries, searching for users to follow, editing profile, changing password, accessing a help center, displaying a privacy policy, displaying one or more terms etc.

In one embodiment, the user's home page provides a second that displays a number of statistics. In one embodiment, the user's home page includes indication 504 that indicates the number of swipes the user has taken. In one embodiment, indication 504 is in the form of a karate belt system in which the color of the belt changes as the number of swipes increases. In one embodiment, the user's home page also includes another indication 505 that indicates the number of times the user has failed to commit to a full purchase price. In one embodiment, indication 505 is in the form of a stop light in which the colors of the stop light changes to indicate the number of times the user has failed to commit to a full purchase price. The user's home page may also include an indication of the number of followers or the number of people that they are following, as well as the prize money that they have earned. Button 503 may also allow the user to collapse the statistic section of the user's home page that indicates their number of swipes, the number of times they have failed to commit to a purchase price, the number of followers, the number of people they are following and the prize money they have earned.

In one embodiment, the user's home page also includes a collection display area 506 in which the user's own collection of artwork is displayed along with its value and rank may be displayed, as well as one or more other virtual galleries that the user has. From the collection display area 506, the user is able to click on any collection or any virtual gallery and be taken to a page in the user interface for a piece of art in the gallery or that collection. In one embodiment, collection display area 506 allows the user to scroll up or down to see the various galleries that may be selected.

FIG. 5B illustrates the user's home page displayed with one virtual gallery being displayed in collections display area 506. By clicking on an individual work of art in the gallery, that piece of art may be enlarged to fill collections display area 506 that depicts the virtual gallery. In one embodiment, any single virtual gallery can hold up to 30 pieces of art; however, it should be noted that other embodiments may have other different numbers of art in each virtual gallery.

FIG. 5C illustrates the display of the user's home page after the user has selected an individual piece of art from a virtual gallery or their collection. As shown in the collections display area 506, the piece of art is displayed along with an indication of the number of people that have liked the art, have passed on the art and who have held the art. Buttons are also provided in the collection display area with the individual piece of art to allow the user to take actions with respect to the piece of art. For example, artist button 507 may be selected to have information about the artist displayed in the display area. Bid button 508 may be selected to enable the user to initiate or join an auction for the art. In one embodiment, delete button 509 is also included on the user's home page with a piece of art to enable the user to delete the piece of art from their virtual gallery. In response to selection of any of these buttons, the client machine generates and transmits a notification message to the platform and the platform takes appropriate action to provide data or other information (e.g. another user interface page, bid screen, etc.) to the user's client machine. Note this occurs in response to any user interaction with any page of the user interface.

Figure 6A:
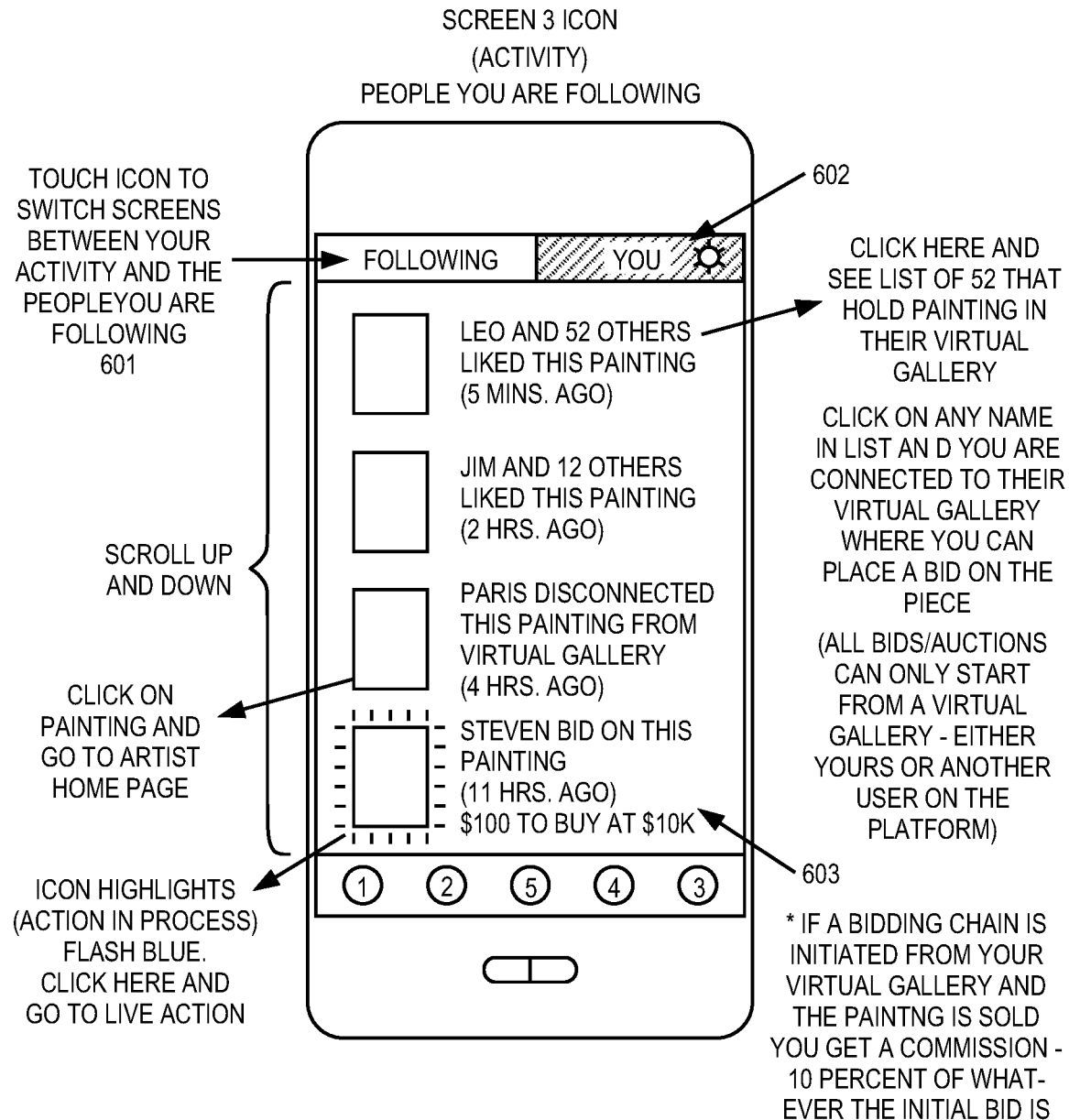
Figure 6B:
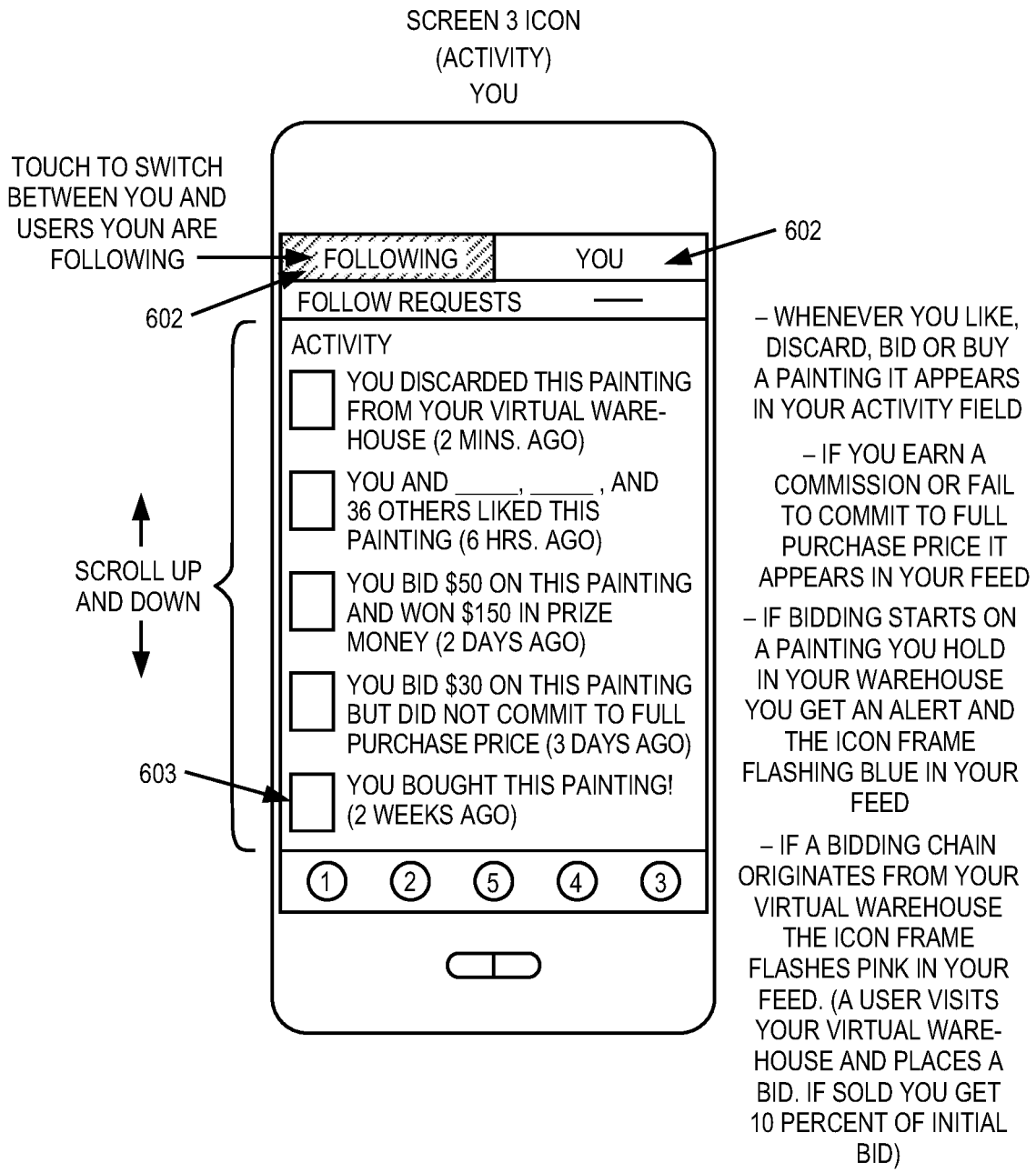

If the user selects the button for the activity page, the user is taken to an activity display page. FIGS. 6A and 6B illustration examples of the user activity page. In one embodiment, the activity page enables the user to view people that they are following. In one embodiment, the activity screen includes buttons 601 and 602 that enable the user to either select people they are following if GUI button 601 is selected or to perform an activity if GUI button 602 is selected. In one embodiment, if the user selects button 601 to provide information on people they are following, a list of people which may be scrolled is depicted in the display screen area 603. This is the list of people that are being followed. In one embodiment, a piece of art that each person being followed has "liked" is also depicted. By clicking on the piece of art, the user is taken to the virtual gallery of the user they are following that contains the piece of art. From the virtual gallery, they can click on the image and be taken to the artist's home page. That is, the client machine generates and transmits a message to the platform, which sends the artist's home page in response thereto.

In one embodiment, if the user can click on any individual followers and see a list of the individuals that hold the painting in their virtual gallery. In one embodiment, if a user clicks on or otherwise selects a name in the list, that individual's virtual gallery is displayed on the user's client machine and the page includes an area where the user can place a bid on a piece of art. In one embodiment, all bids and auctions can only start from a virtual gallery. The virtual gallery may be your own virtual gallery or the virtual gallery of another on the platform.

In one embodiment, if a bidding chain is initiated from a user's virtual gallery and the piece of artwork (e.g., painting) is sold, that user obtains a commission on the sale. In one embodiment, the commission may be a percentage (e.g., 10%) of the initial bid.

In one embodiment, if an auction is currently taking place with respect to one of the artwork being depicted in display area 603, an indication may be provided in the display area. For example, the artwork may be flashing or otherwise highlighted to indicate that a bid is occurring. In response to clicking on, or otherwise selecting, the highlighted piece of art, in one embodiment, the user is taken to the auction display screen at which point the user may bid.

In the user selects the activity page button 602, the user is taken to their activity feed. From the activity feed, the user may scroll through a number of activities that may be selected from the feed. Whenever the user wishes to like, discard, bid or buy a painting, it appears in their activity feed. If the user earns a commission or fails to commit to the full purchase price, it appears in the feed as well. In one embodiment, if bidding starts on a painting that is being held by the user in their gallery, an alert is sent to the user and the icon flashes or is otherwise highlighted to indicate that an auction is taking place. In one embodiment, if a bidding chain originated from the virtual gallery of the user, an indication (e.g. an icon frame flashes a particular color (e.g. pink)). In one embodiment, if a user visits a person's virtual gallery and places a bid and it is sold, the owner of that virtual gallery gets a commission that is based on the initial bid price (e.g., 10% of the bid).

Figure 7:
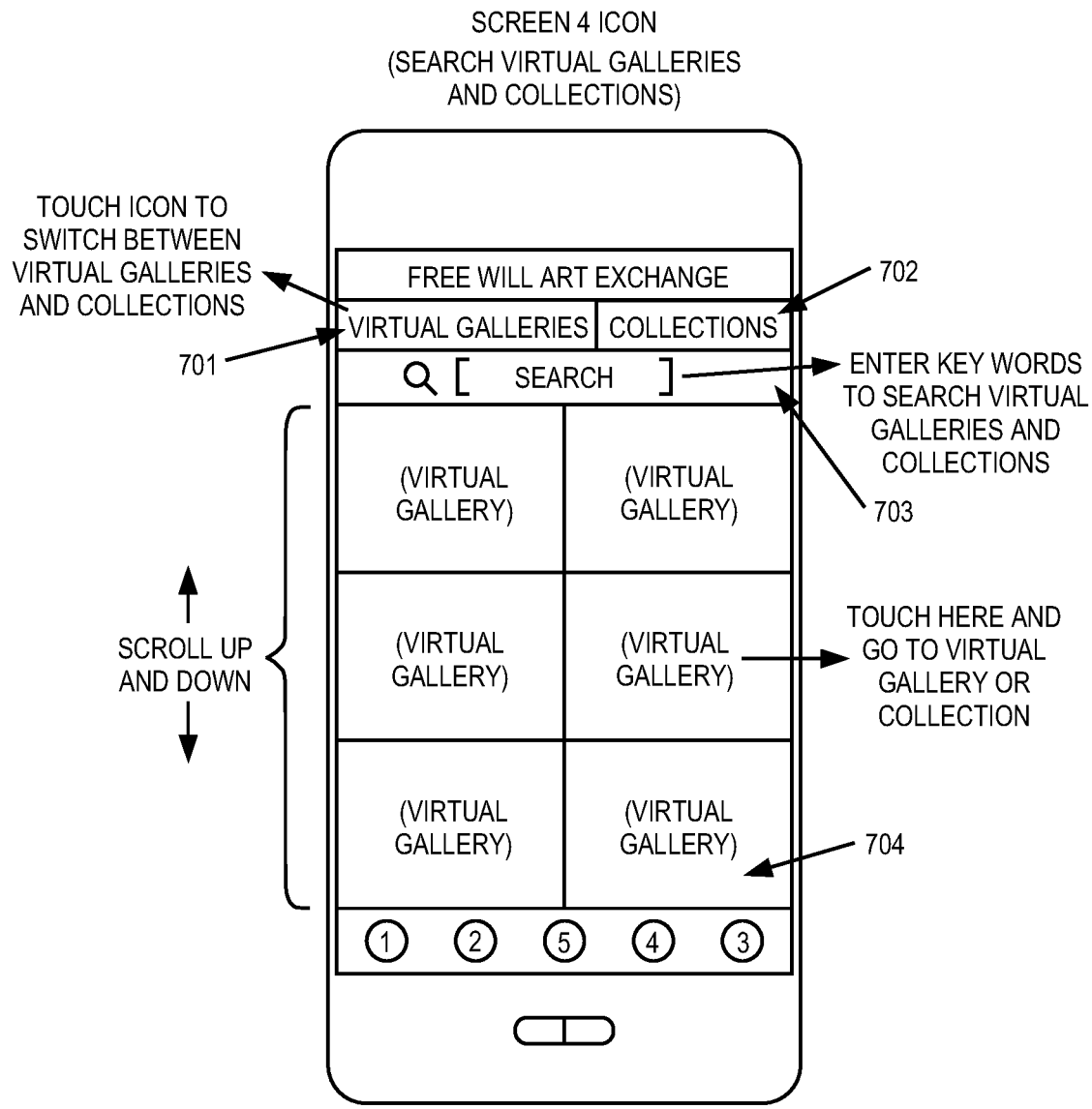

FIG. 7 illustrates one embodiment of a search page that is depicted when the search button on the user interface is selected. In one embodiment, when viewing the search page, the user is able to select button 701 to view their virtual galleries or button 702 to view their collection. The search screen may also include a search window 703 that allows the user to enter key words to search their virtual galleries and collections as well as the galleries and collections of others. The virtual galleries and collections are depicted in display area 704. By selecting any of the areas in display area 704, the user display changes to display the virtual gallery that has been selected. In one embodiment, the user can enter a number of hash tags to describe their virtual galleries. This enables other users to use key words and search the virtual galleries and collections of others.

Figure 8A:
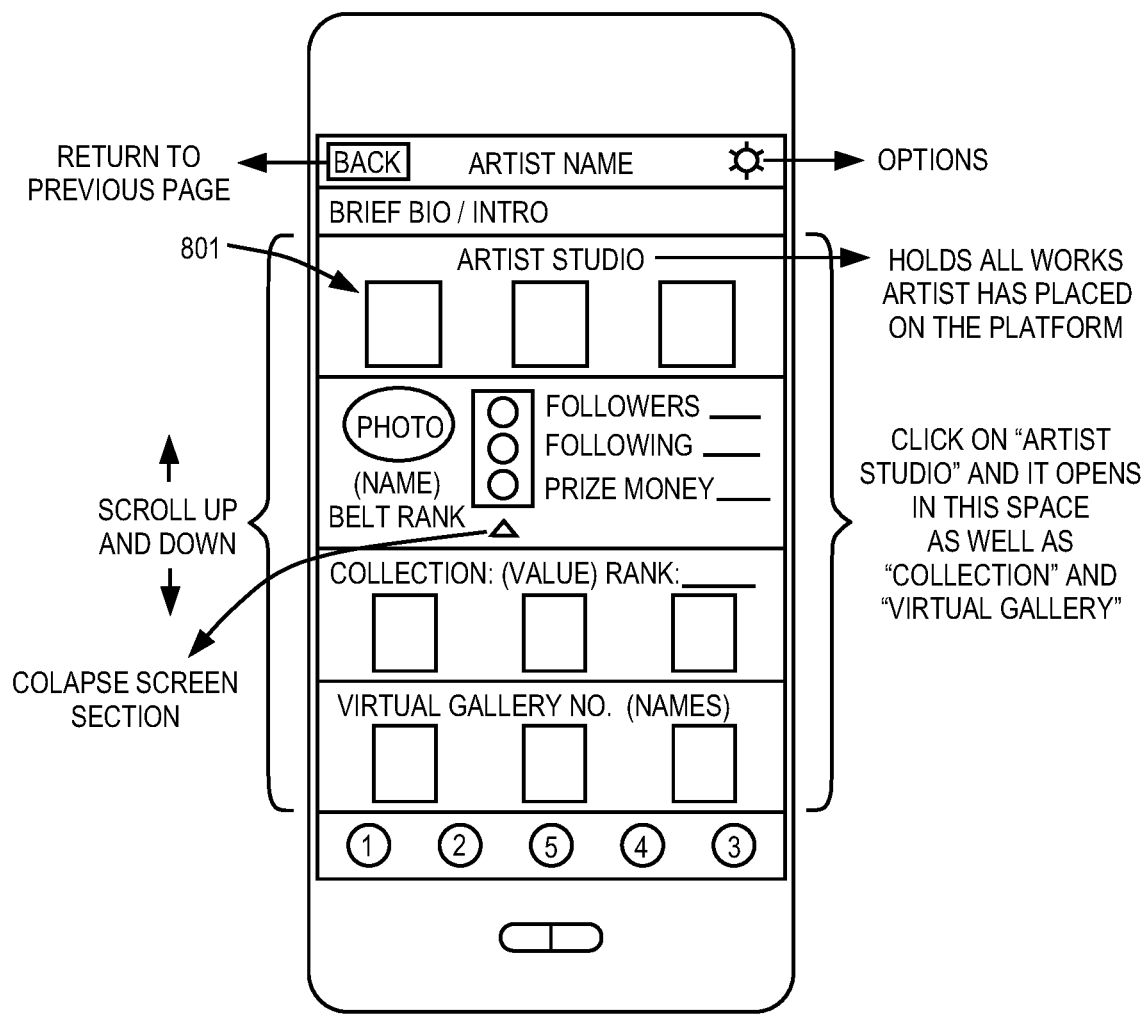
Figure 8B:
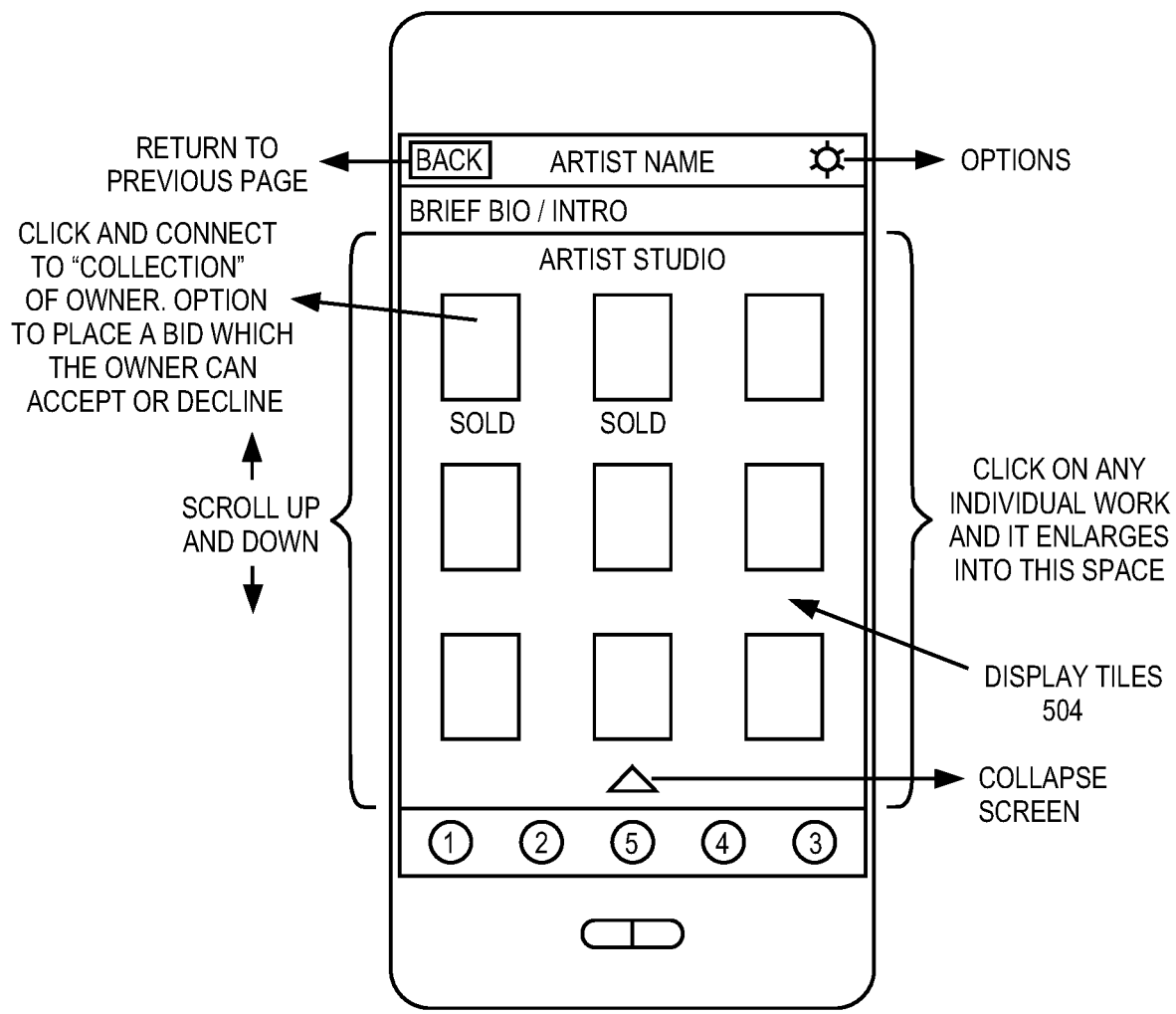
Figure 8C:
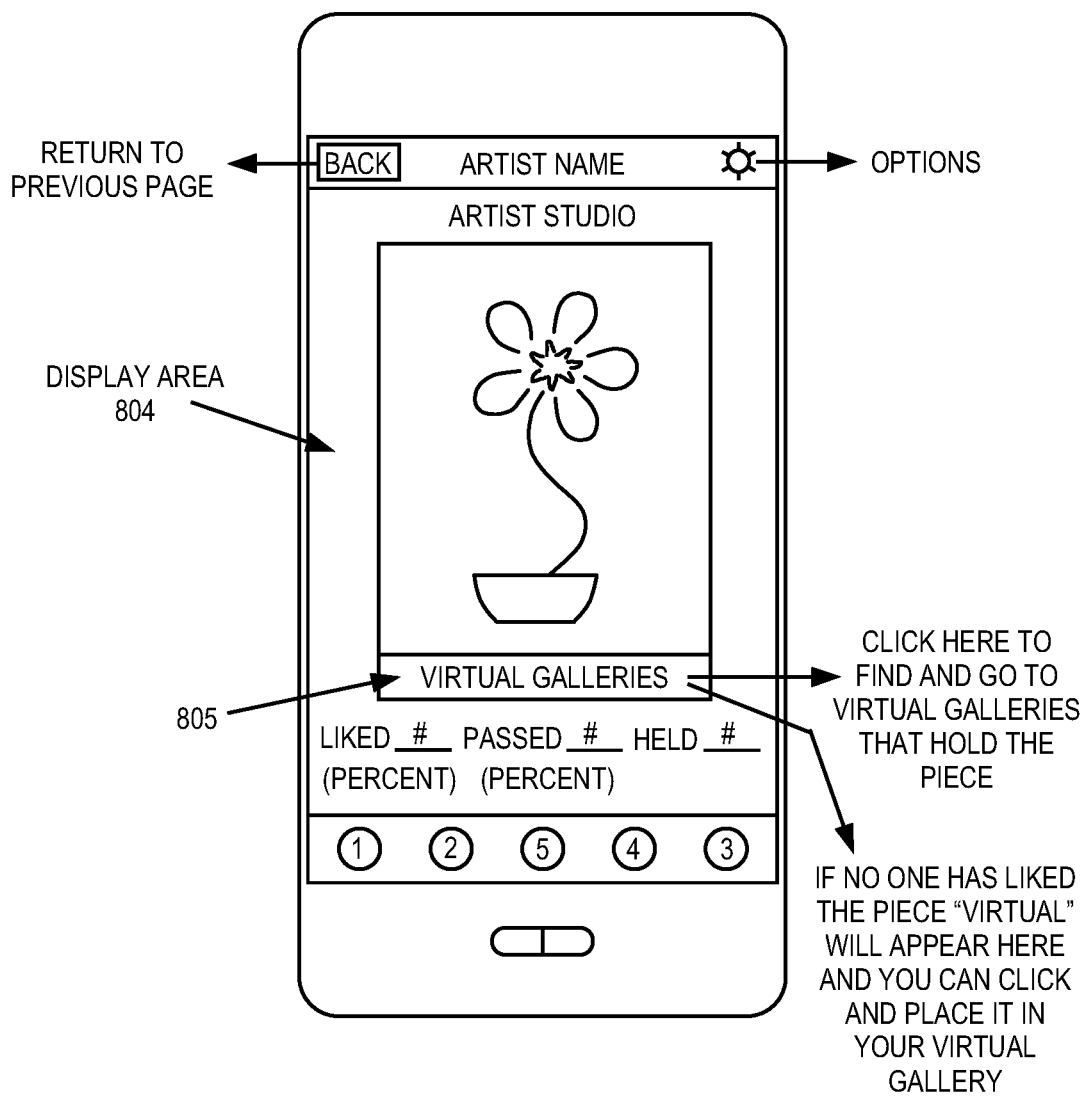

FIGS. 8A through C illustrate examples of the artist's home page. Referring to FIG. 8A, the artist's home page includes a studio area 801 that allows the user to see all the art that the artist has placed on the platform. The artist's home page also includes similar information displayed on an individual user's page of the platform including his virtual gallery, his collection and other indications such as an indication of how many swipes the user has made, an indication of how many purchases the user has failed to complete as well as their numbers of followers, the number of people they are following and the prize money they have earned.

FIG. 8B illustrates the example of the display page if a user selects the artist's studio display area 801 when viewing an artist's home page. If this occurs, the art is depicted from their "virtual studio". This may include art that has already been sold. By clicking on any piece of individual work, the individual work is enlarged into the entire display area 804. By clicking on any art, even those that are sold, the user is connected to the owner and may place a bid on the art which the owner may accept or decline.

FIG. 8C illustrates an example of an individual piece of art that has been displayed after selecting an individual piece of art in the artist's "virtual studio". In one embodiment, the art is displayed in the entire display area 804. An GUI element 805 is provided and enables the user to select the virtual galleries in which the art is displayed. By clicking on GUI button 804, the user can find a list of the virtual galleries that hold the piece. If no one has liked the piece, the virtual galleries may be replaced by another indication (e.g., virgin) to indicate that no one has indicated a liking of the art up to this point. In one embodiment, if a piece is indicated to be "virgin", the user can "like" it and claim it to his virtual gallery, and this appears in his activity feed and can be seen by all his followers.

Figure 9:
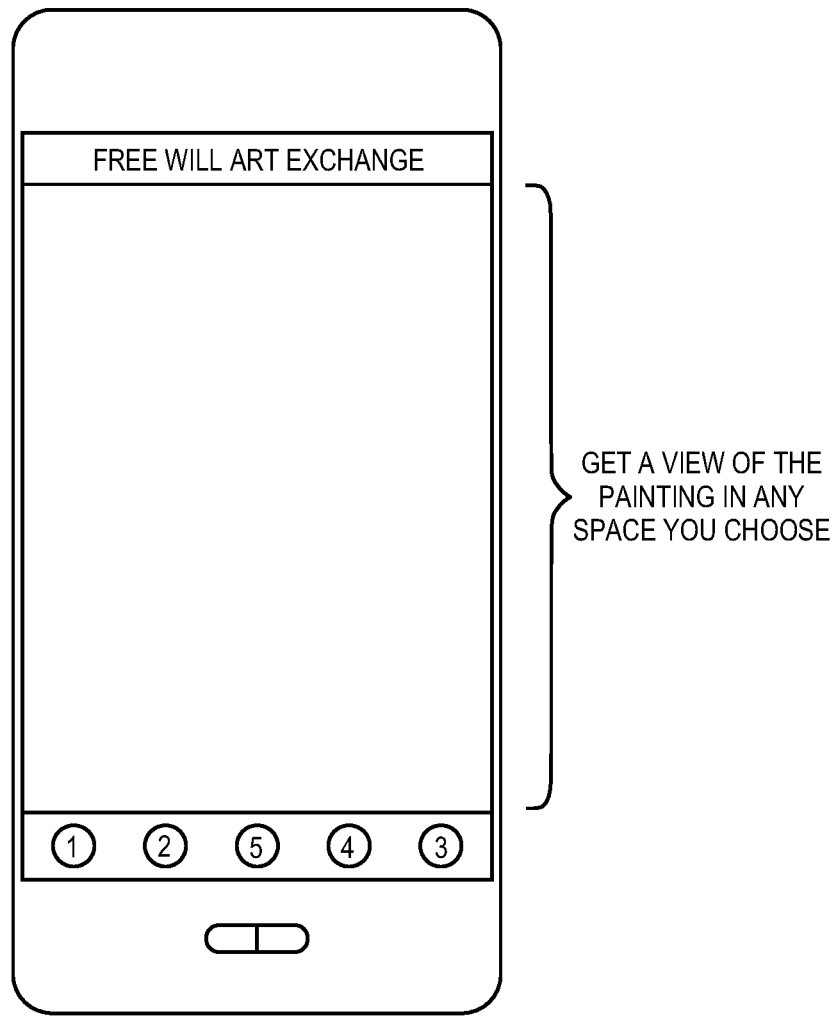

FIG. 9 illustrates the augmented reality page in which the user can view any piece of artwork in any space that is chosen. For example, if the user wants to see what a piece of art would look like in a particular room or wall of their home, the platform generates a virtual reality representation for display on the client machine that allows a user to view the artwork appropriately sized from multiple perspective.

Figure 10:
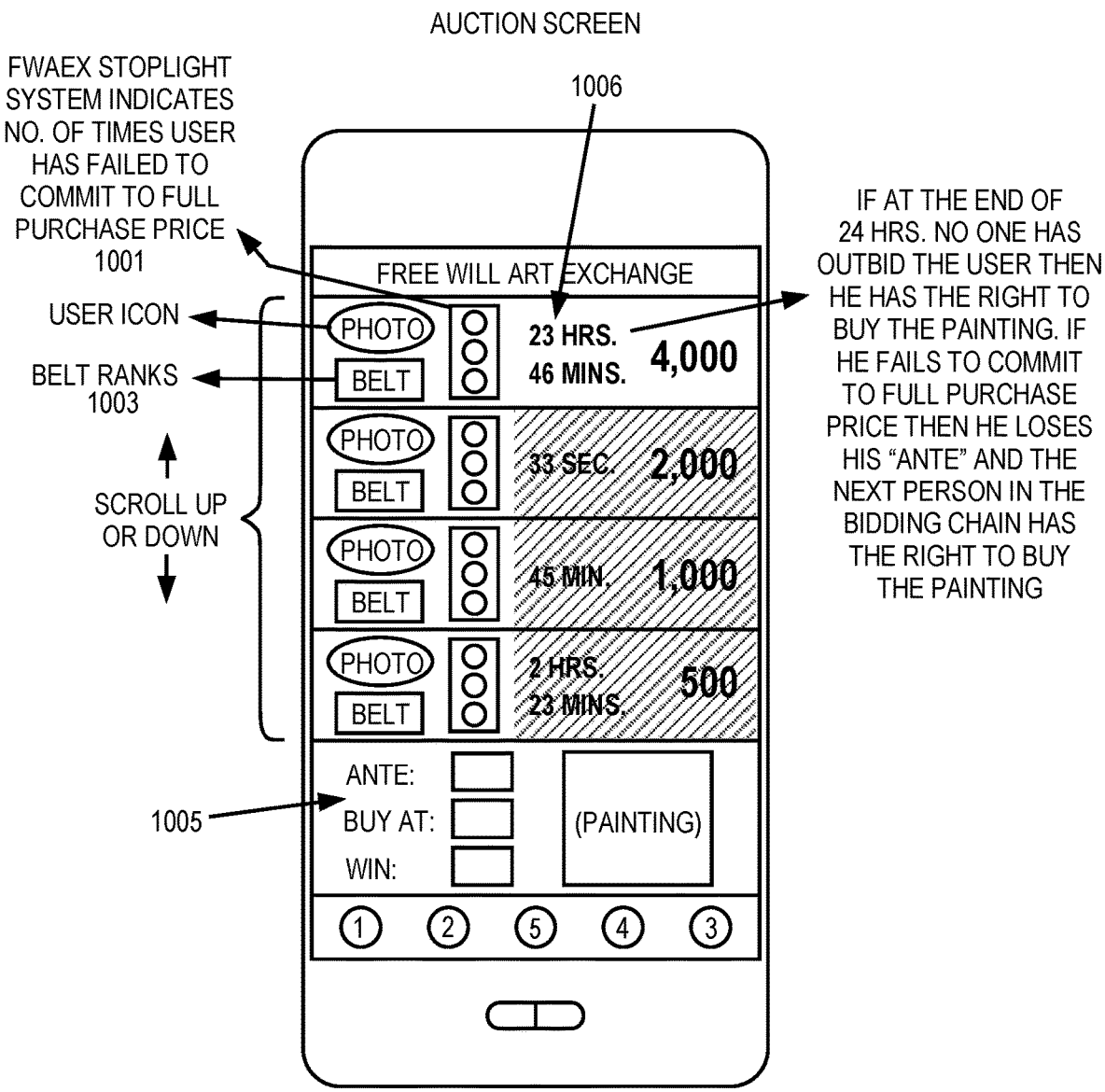

FIG. 10 illustrates an example of an auction page that depicts a list of auctions that are occurring at the time that the user is following. In one embodiment, the auction page provides an indication 1001 of the number of users that have failed to commit to the full purchase price as well as a user icon associated with the auction, and an indication of the number of swipes 1003.

In one embodiment, display area 1005 is used indicate a price at which the user is willing to buy the painting (e.g., a bid), the ante or the winning price. In one embodiment, a time indication is also provided in area 1006. If at the end of a certain time period and no one has bid, the user then has the right to buy the painting. In one embodiment, this time period is 24 hours, though other time periods may be set. If the user fails to commit to the full purchase price, then he loses the ante and the next person in the bidding chain has the right to buy the painting. In one embodiment, bids can only be initiated from a virtual gallery. The virtual gallery may be that of the user himself or some other person's virtual gallery they are following or the virtual gallery of another user on the platform. In one embodiment, a user can only add art to their virtual gallery from a main feed. In one embodiment, if a bidding chain is initiated from a virtual gallery and the painting sells, the user that owned the virtual gallery gets a percentage of the initial bid.

In one embodiment, if an auction occurs and the winner fails to commit to the full purchase price, that person user loses their bidder ante and the auction moves down to the next person. Each successive user who fails to commit to the full purchase price loses their bid or ante.

Figure 11:
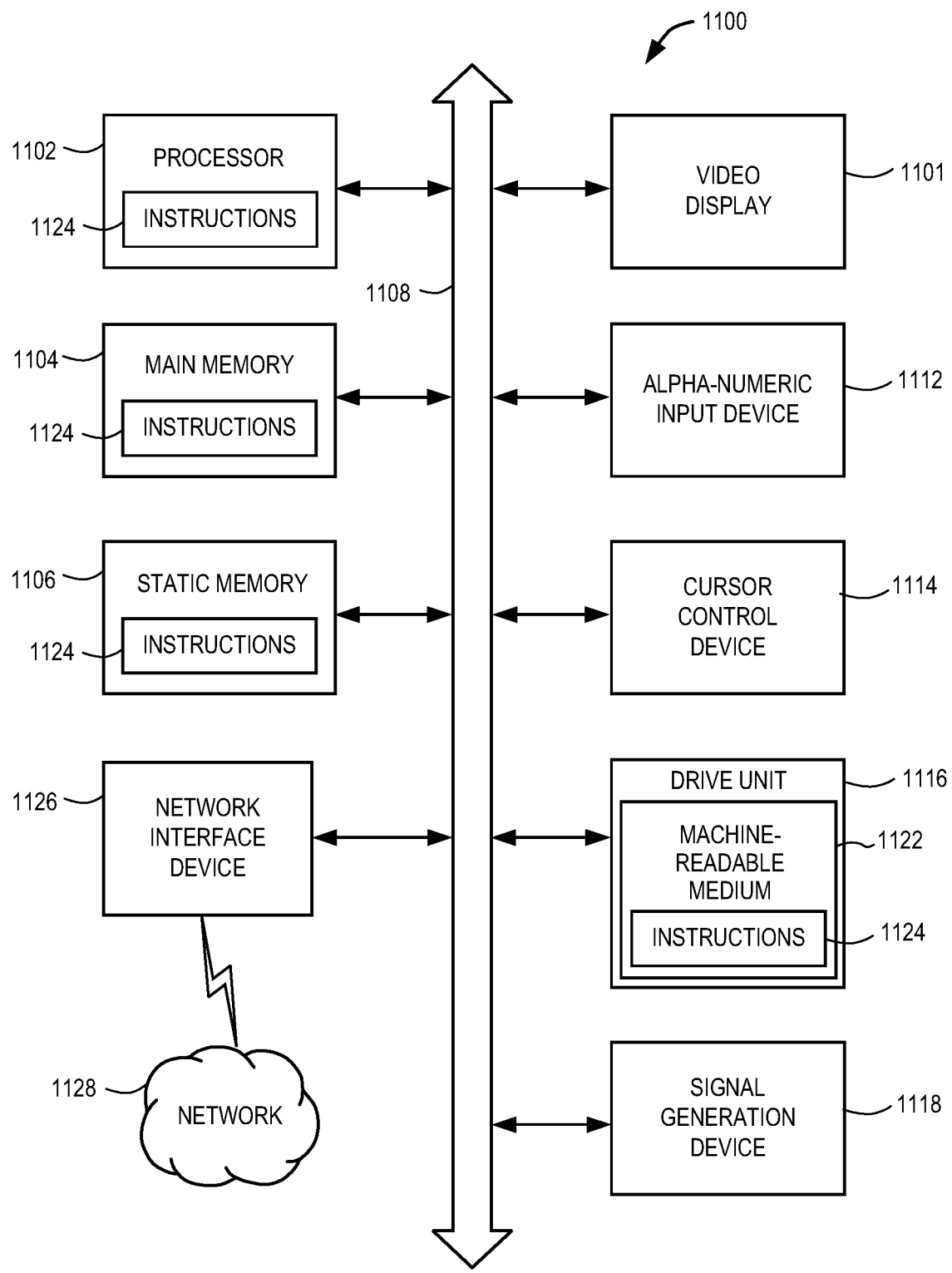
FIG. 11 shows a diagrammatic representation of machine in the example form of a computer system.

FIG. 11 shows a diagrammatic representation of machine in the example form of a computer system 1100 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a cellular telephone, a handheld or mobile device such as a smartphone a server computer, a client computer, a personal computer (PC), a tablet PC, a set-top box (STB), a Personal Digital Assistant (PDA), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU) a graphics processing unit (GPU) or both), a main memory 1104 and a static memory 1106, which communicate with each other via a bus 1108. The computer system 1100 may further include a video display unit 1101 (e.g., a liquid crystal display (LCD) or a cathode ray tube (CRT)). The computer system 1100 also includes an alphanumeric input device 1112 (e.g., a keyboard), a cursor control device 1114 (e.g., a mouse), a disk drive unit 1116, a signal generation device 1118 (e.g., a speaker) and a network interface device 1126. In some embodiments, the computer system 1100 may include a touch screen.

The disk drive unit 1116 includes a machine-readable medium 1122 on which is stored one or more sets of instructions (e.g., software 1124) embodying any one or more of the methodologies or functions described herein. The software 1124 may also reside, completely or at least partially, within the main memory 1104 and/or within the processor 1102 during execution thereof by the computer system 1100, the main memory 1104 and the processor 1102 also constituting machine-readable media.

The software 1124 may further be transmitted or received over a network 1128 via the network interface device 1126.

While the machine-readable medium 1122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

There is a number of example embodiments described herein.

Example 1 is a method for operating an art auction platform that comprises: streaming one or more feeds of images of a plurality of pieces of artwork to client machines of users of the platform for display on screens of the client machines; generating events in response to feedback received from the client machines, the feedback sent wirelessly from the client machines of the users viewing the one or more feeds, the feedback being generated in response to one or more gestures made with respect to the mobile devices that indicate user opinion with respect to individual pieces of artwork in the plurality of artwork, the events triggering generation of virtual galleries for the users; maintaining one or more virtual galleries for each user of images of artwork from the one or more feeds, each of the virtual galleries viewable by users of the platform on their client machine, each virtual gallery that is associated with each user containing images of artwork that said each user indicated that they liked while viewing the one or more feeds; receiving an indication from a first user wanting to bid on a first piece of artwork being viewed as part of a first virtual gallery in response to the user selecting a graphical user interface element on a display of one client machine displaying the first piece of artwork of the first virtual gallery; wirelessly sending, via a wireless communication network, an auction notification to each of a first set of client machines of users that have the first piece of artwork in at least one of their virtual galleries, the auction notification indicating an auction for the first piece of artwork is to occur; and performing an auction for the first piece of artwork via the wireless communication network, including receiving one or more messages containing bids transmitted from client machines in the first set of client machines, generating and pushing notifications regarding the auction, including bid information, to the first set of client machines, and concluding the auction, including transferring funds via electronic transfer to the user having the first virtual gallery if the auction concludes in a sale of the first piece of artwork due to the auction being started from the first virtual gallery.

Example 2 is the method of example 1 that may optionally include generating bid notification message that comprise a user interface element configured to enable a client machine of the user to send an auction-related message associated with the auction; and transmitting the bid notification message to the client machine.

Example 3 is the method of example 2 that may optionally include establishing an electronic connection with client machines in response to receiving auction-related messages from the client machines, the auction-related messages creating events, and filtering a plurality of events related to the auction to obtain a filtered event that includes the highest received bid in the auction, the filtered event being pushed for display on the client machine via the electronic connection before an end of the auction, the pushing of the filtered event causing a display on the client machine notifying the user of the highest received bid in the auction.

Example 4 is the method of example 1 that may optionally include that the client machines are mobile devices.

Example 5 is the method of example 1 that may optionally include that each piece of artwork comprises an image of a painting.

Example 6 is the method of example 1 that may optionally include that the opinion is an indication of a like or dislike of each of the individual pieces of art work.

Example 7 is the method of example 6 that may optionally include that the gesture is a swiping of the artwork in one of two directions, the two directions indicating the like or dislike of each of the individual pieces of artwork.

Example 8 is the method of example 1 that may optionally include enabling access to a first user of the platform to a first virtual gallery of a second user of the platform.

Example 9 is the method of example 8 that may optionally include that access to the first virtual gallery is enabled in response to a search performed by the platform in response to the first user entering a search on their client machine.

Example 10 is the method of example 1 that may optionally include that the one or more feeds comprises a first feed of artwork that is considered trending upward in popularity and a second feed of artwork that is less well-known art in comparison to artwork in the first feed.

Example 11 is the method of example 1 that may optionally include performing an electronic funds transfer to deposit a percentage of the price of the artwork to secure a timed right to exclusion to purchase the artwork.

Example 12 is the method of example 11 that may optionally include providing a chance to others to outbid the current bid for the artwork.

Example 13 is the method of example 1 that may optionally include performing a first electronic fund transfer to the artist of the first piece of artwork to pay the artist paying the artist a percentage of a final auction price of the artwork and performing additional electronic fund transfers to pay each user participating as bidders in the auction a commission based on a percentage of their bidding price point.

Example 14 is a non-transitory machine-readable medium having stored thereon one or more instructions, which if performed by a machine causes the machine to perform a method for operating an art auction platform comprising: streaming one or more feeds of images of a plurality of pieces of artwork to client machines of users of the platform for display on screens of the client machines; generating events in response to feedback received from the client machines, the feedback sent wirelessly from the client machines of the users viewing the one or more feeds, the feedback being generated in response to one or more gestures made with respect to the mobile devices that indicate user opinion with respect to individual pieces of artwork in the plurality of artwork, the events triggering generation of virtual galleries for the users; maintaining one or more virtual galleries for each user of images of artwork from the one or more feeds, each of the virtual galleries viewable by users of the platform on their client machine, each virtual gallery that is associated with each user containing images of artwork that said each user indicated that they liked while viewing the one or more feeds; receiving an indication from a first user wanting to bid on a first piece of artwork being viewed as part of a first virtual gallery in response to the user selecting a graphical user interface element on a display of one client machine displaying the first piece of artwork of the first virtual gallery; wirelessly sending, via a wireless communication network, an auction notification to each of a first set of client machines of users that have the first piece of artwork in at least one of their virtual galleries, the auction notification indicating an auction for the first piece of artwork is to occur; and performing an auction for the first piece of artwork via the wireless communication network, including receiving one or more messages containing bids transmitted from client machines in the first set of client machines, generating and pushing notifications regarding the auction, including bid information, to the first set of client machines, and concluding the auction, including transferring funds via electronic transfer to the user having the first virtual gallery if the auction concludes in a sale of the first piece of artwork due to the auction being started from the first virtual gallery.

Example 15 is the non-transitory machine-readable medium of example 14 that may optionally include that the method further comprises: generating bid notification message that comprise a user interface element configured to enable a client machine of the user to send an auction-related message associated with the auction; and transmitting the bid notification message to the client machine; establishing an electronic connection with client machines in response to receiving auction-related messages from the client machines, the auction-related messages creating events, and filtering a plurality of events related to the auction to obtain a filtered event that includes the highest received bid in the auction, the filtered event being pushed for display on the client machine via the electronic connection before an end of the auction, the pushing of the filtered event causing a display on the client machine notifying the user of the highest received bid in the auction.

Example 16 is the non-transitory machine-readable medium of example 14 that may optionally include that each piece of artwork comprises an image of a painting.

Example 17 is the non-transitory machine-readable medium of example 14 that may optionally include that the opinion is an indication of a like or dislike of each of the individual pieces of art work, and wherein the gesture is a swiping of the artwork in one of two directions, the two directions indicating the like or dislike of each of the individual pieces of artwork.

Example 18 is the non-transitory machine-readable medium of example 14 that may optionally include that the method further comprises performing an electronic funds transfer to deposit a percentage of the price of the artwork to secure a timed right to exclusion to purchase the artwork.

Example 19 is the non-transitory machine-readable medium of example 14 that may optionally include that the method further comprises performing a first electronic fund transfer to the artist of the first piece of artwork to pay the artist paying the artist a percentage of a final auction price of the artwork and performing additional electronic fund transfers to pay each user participating as bidders in the auction a commission based on a percentage of their bidding price point.

Example 20 is a system comprising: a storage device storing instructions; and one or more hardware processors configured by the instructions to perform operations comprising stream one or more feeds of images of a plurality of pieces of artwork to client machines of users of the platform for display on screens of the client machines, generate events in response to feedback received from the client machines, the feedback sent wirelessly from the client machines of the users viewing the one or more feeds, the feedback being generated in response to one or more gestures made with respect to the mobile devices that indicate user opinion with respect to individual pieces of artwork in the plurality of artwork, the events triggering generation of virtual galleries for the users, maintain one or more virtual galleries for each user of images of artwork from the one or more feeds, each of the virtual galleries viewable by users of the platform on their client machine, each virtual gallery that is associated with each user containing images of artwork that said each user indicated that they liked while viewing the one or more feeds, receive an indication from a first user wanting to bid on a first piece of artwork being viewed as part of a first virtual gallery in response to the user selecting a graphical user interface element on a display of one client machine displaying the first piece of artwork of the first virtual gallery, wirelessly transmit, via a wireless communication network, an auction notification to each of a first set of client machines of users that have the first piece of artwork in at least one of their virtual galleries, the auction notification indicating an auction for the first piece of artwork is to occur, and perform an auction for the first piece of artwork via the wireless communication network, by receiving one or more messages containing bids transmitted from client machines in the first set of client machines, generating and pushing notifications regarding the auction, including bid information, to the first set of client machines, and concluding the auction, including transferring funds via electronic transfer to the user having the first virtual gallery if the auction concludes in a sale of the first piece of artwork due to the auction being started from the first virtual gallery.

Example 21 is the system of example 20 that may optionally include that the operations further comprise: generating bid notification message that comprise a user interface element configured to enable a client machine of the user to send an auction-related message associated with the auction; transmitting the bid notification message to the client machine; establishing an electronic connection with client machines in response to receiving auction-related messages from the client machines, the auction-related messages creating events, and filtering a plurality of events related to the auction to obtain a filtered event that includes the highest received bid in the auction, the filtered event being pushed for display on the client machine via the electronic connection before an end of the auction, the pushing of the filtered event causing a display on the client machine notifying the user of the highest received bid in the auction.

Example 22 is the system of example 20 that may optionally include that each piece of artwork comprises an image of a painting.

Example 23 is the system of example 20 that may optionally include that the opinion is an indication of a like or dislike of each of the individual pieces of art work, and wherein the gesture is a swiping of the artwork in one of two directions, the two directions indicating the like or dislike of each of the individual pieces of artwork.

Example 24 is the system of example 20 that may optionally include that the operations further comprise performing an electronic funds transfer to deposit a percentage of the price of the artwork to secure a timed right to exclusion to purchase the artwork.

Example 25 is the system of example 20 that may optionally include that the operations further comprise performing a first electronic fund transfer to the artist of the first piece of artwork to pay the artist paying the artist a percentage of a final auction price of the artwork and performing additional electronic fund transfers to pay each user participating as bidders in the auction a commission based on a percentage of their bidding price point.

Additionally, certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and a scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

Thus, a method and system to provide substantially real-time bidding have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. A method for operating an art auction platform, the method comprising:

streaming one or more feeds of images of a plurality of pieces of artwork to client machines of users of the platform for display on screens of the client machines of the users of the platform;

generating events in response to feedback received from the client machines of the users of the platform, the feedback sent wireles sly from the client machines of the users of the platform, wherein the users of the platform are viewing the one or more feeds, the feedback being generated in response to one or more gestures made with respect to the client machines of the users of the platform and where the feedback is tracked and made available to the client machines of the users of the platform to indicate user opinion with respect to individual pieces of artwork of the plurality of pieces of artwork;

maintaining one or more virtual galleries for each user of the users of the platform, wherein the one or more galleries are of images of artwork from the one or more feeds, wherein each of the one or more virtual galleries are viewable by the client machines of the users of the platform, each of the one or more virtual galleries is associated with each user of the users of the platform containing images of artwork that said each user of the users of the platform liked while viewing the one or more feeds;

tracking followers of the users of the platform;

providing each image of the images of artwork in each of the one or more virtual galleries associated with each user of the users of the platform along with information regarding the tracked feedback and tracked followers of said each image of the images of artwork in each of the one or more virtual galleries associated with each user of the users of the platform for display in a single user interface window via an application program running on the client machines of the users of the platform, wherein the client machines of the users of the platform are mobile devices, wherein the single user interface window includes graphical user interface elements that cause the platform to perform actions associated with said each image of the images of artwork in each of the one or more virtual galleries associated with each user of the users of the platform, the actions comprising collapsing from view a section of the single user interface window containing the information regarding the tracked feedback and the tracked followers in response to an individual user of the users of the platform selecting a first graphical user interface element on the single user interface window, wherein the first graphical user interface element is displayed by one client machine of the client machines of the users of the platform concurrently with a first piece of artwork of a first virtual gallery of the one or more galleries;

receiving an indication from a first user wanting to bid on the first piece of artwork being viewed as part of the first virtual gallery of the one or more galleries in response to the first user selecting a second graphical user interface element on the single user interface window, wherein the second graphical user interface element is displayed by the one client machine of the client machines of the users of the platform concurrently with the first piece of artwork of the first virtual gallery of the one or more galleries and the information regarding the tracked followers and the tracked feedback;

wirelessly sending, via a wireless communication network, an electronic auction notification to each of a first set of client machines of users that have the first piece of artwork in at least one virtual gallery of the first set of client machines in response to the first user selecting the second graphical user interface element on the single user interface window, the electronic auction notification indicating an auction for the first piece of artwork is to occur; and performing, in response to the first user selecting the second graphical user interface element on the single user interface window, the auction for the first piece of artwork via the wireless communication network during which the information regarding the tracked feedback, the tracked followers, and virtual galleries associated with the first set of client machines of the users that have the first piece of artwork in the at least one virtual gallery of the first set of client machines are available to the first set of client machines for use during the auction, the performing including receiving one or more messages containing bids transmitted from client machines of the first set of client machines, generating and pushing a second notification regarding the auction, including bid information, to the first set of client machines, and concluding the auction, including transferring funds via electronic transfer to a second user having the first virtual gallery in response to the auction concluding in a sale of the first piece of artwork due to the auction being started from the first virtual gallery.

2. The method defined in claim 1 further comprising:

generating a bid notification message that comprises a user interface element configured to enable the client machines of the users of the platform to send an auction-related message associated with the auction; and transmitting the bid notification message to the client machines of the client machines of the users of the platform.

3. The method defined in claim 2 further comprising:

establishing an electronic connection with the client machines of the users of the platform in response to receiving auction-related messages from the client machines of the users of the platform, the auction-related messages creating events, and filtering a plurality of events related to the auction to obtain a filtered event that includes the highest received bid in the auction, the filtered event being pushed for display on the client machines of the users of the platform via the electronic connection before an end of the auction, the pushing of the filtered event causing a display on the client machines of the users of the platform notifying the users of the platform of the highest received bid in the auction.

4. The method defined in claim 1 wherein each piece of the plurality of pieces of artwork comprises an image of a painting.

5. The method defined in claim 1 wherein the user opinion is an indication of a like or dislike of each of the individual pieces of art work.

6. The method defined in claim 5 wherein the one or more gesture are swiping of the artwork in one of two directions, the two directions indicating the like or dislike of each piece of the individual pieces of artwork in the plurality of pieces of artwork.

7. The method defined in claim 1 further comprising enabling access by the first user of the platform to the first virtual gallery of the second user of the platform.

8. The method defined in claim 7 wherein access to the first virtual gallery is enabled in response to a search performed by the platform in response to the first user entering a search on the one client machine of the client machines of the users of the platform.

9. The method defined in claim 1 wherein the one or more feeds comprises a first feed of artwork that is considered trending upward in popularity and a second feed of artwork that is less well-known art in comparison to artwork in the first feed.

10. The method defined in claim 1 further comprising performing the electronic funds transfer to deposit a percentage of the price of the artwork to secure a timed right to exclusion to purchase the artwork.

11. The method defined in claim 10 further comprising providing a chance to other users of the platform to outbid the current bid for the artwork.

12. The method defined in claim 1 further comprising performing a first electronic fund transfer to the artist of the first piece of artwork to pay the artist, paying the artist a percentage of a final auction price of the artwork and performing additional electronic fund transfers to pay the client machines in the first set of client machines that transmitted the one or more messages containing the bid information a commission based on a percentage of their bidding price point.

13. A non-transitory machine-readable medium having stored thereon one or more instructions, which if performed by a machine causes the machine to perform a method for operating an art auction platform comprising:

streaming one or more feeds of images of a plurality of pieces of artwork to client machines of users of the platform for display on screens of the client machines of the users of the platform;

generating events in response to feedback received from the client machines of the users of the platform, the feedback sent wirelessly from the client machines of the users of the platform, wherein the users of the platform are viewing the one or more feeds, the feedback being generated in response to one or more gestures made with respect to the client machines of the users of the platform and where the feedback is tracked and made available to the client machines of the users of the platform to indicate user opinion with respect to individual pieces of artwork of the plurality of pieces of artwork;

maintaining one or more virtual galleries for each user of the users of the platform, wherein the one or more galleries are of images of artwork from the one or more feeds, wherein each of the one or more virtual galleries are viewable by the client machines of the users of the platform, each of the one or more virtual galleries is associated with each user of the users of the platform containing images of artwork that said each user of the users of the platform liked while viewing the one or more feeds;

tracking followers of the users of the platform;

providing each image of the images of artwork in each of the one or more virtual galleries associated with each user of the users of the platform along with information regarding the tracked feedback and tracked followers of said each image of the images of artwork in each of the one or more virtual galleries associated with each user of the users of the platform for display in a single user interface window via an application program running on the client machines of the users of the platform, wherein the client machines of the users of the platform are mobile devices, wherein the single user interface window includes graphical user interface elements that cause the platform to perform actions associated with said each image of the images of artwork in each of the one or more virtual galleries associated with each user of the users of the platform, the actions comprising collapsing from view a section of the single user interface window containing the information regarding the tracked feedback and the tracked followers in response to an individual user of the users of the platform selecting a first graphical user interface element on the single user interface window, wherein the first graphical user interface element is displayed by one client machine of the client machines of the users of the platform concurrently with a first piece of artwork of a first virtual gallery of the one or more galleries;

receiving an indication from a first user wanting to bid on the first piece of artwork being viewed as part of the first virtual gallery of the one or more galleries in response to the first user selecting a second graphical user interface element on the single user interface window, wherein the second graphical user interface element is displayed by the one client machine of the client machines of the users of the platform concurrently with the first piece of artwork of the first virtual gallery of the one or more galleries and the information regarding the tracked followers and the tracked feedback;

wirelessly sending, via a wireless communication network, an electronic auction notification to each of a first set of client machines of users that have the first piece of artwork in at least one virtual gallery of the first set of client machines in response to the first user selecting the second graphical user interface element on the single user interface window, the electronic auction notification indicating an auction for the first piece of artwork is to occur; and performing, in response to the first user selecting the second graphical user interface element on the single user interface window, the auction for the first piece of artwork via the wireless communication network during which the information regarding the tracked feedback, the tracked followers, and virtual galleries associated with the first set of client machines of the users that have the first piece of artwork in the at least one virtual gallery of the first set of client machines are available to the first set of client machines for use during the auction, the performing including receiving one or more messages containing bids transmitted from client machines of the first set of client machines, generating and pushing a second notification regarding the auction, including bid information, to the first set of client machines, and concluding the auction, including transferring funds via electronic transfer to a second user having the first virtual gallery in response to the auction concluding in a sale of the first piece of artwork due to the auction being started from the first virtual gallery.

14. The non-transitory machine-readable medium defined in claim 13 wherein the method further comprises:

generating a bid notification message that comprises a user interface element configured to enable the client machines of the users of the platform of the user to send an auction-related message associated with the auction; and transmitting the bid notification message to the client machines of the client machines of the users of the platform;

establishing an electronic connection with the client machines of the users of the platform in response to receiving auction-related messages from the client machines of the users of the platform, the auction-related messages creating events, and filtering a plurality of events related to the auction to obtain a filtered event that includes the highest received bid in the auction, the filtered event being pushed for display on the client machines of the users of the platform via the electronic connection before an end of the auction, the pushing of the filtered event causing a display on the client machines of the users of the platform notifying the users of the platform of the highest received bid in the auction.

15. The non-transitory machine-readable medium defined in claim 13 wherein each piece of the plurality of pieces of artwork comprises an image of a painting.

16. The non-transitory machine-readable medium defined in claim 13 wherein the user opinion is an indication of a like or dislike of each of the individual pieces of artwork of the plurality of pieces of artwork, and wherein the one or more gestures are a swiping of the individual pieces of artwork of the plurality of pieces of artwork in one of two directions, the two directions indicating the like or dislike of each of the individual pieces of artwork of the plurality of pieces of artwork.

17. The non-transitory machine-readable medium defined in claim 13 wherein the method further comprises performing the electronic funds transfer to deposit a percentage of the price of the first piece of artwork to secure a timed right to exclusion to purchase the first piece of artwork.

18. The non-transitory machine-readable medium defined in claim 13 wherein the method further comprises performing a first electronic fund transfer to the artist of the first piece of artwork to pay the artist, paying the artist a percentage of a final auction price of the artwork and performing additional electronic fund transfers to pay the client machines in the first set of client machines that transmitted the one or more messages containing the bid information a commission based on a percentage of their bidding price point.

19. A system comprising:

a storage device storing instructions; and one or more hardware processors configured by the instructions to perform operations comprising stream one or more feeds of images of a plurality of pieces of artwork to client machines of users of the platform for display on screens of the client machines of the users of the platform, generate events in response to feedback received from the client machines of the users of the platform, the feedback sent wirelessly from the client machines of the users of the platform, wherein the users of the platform are viewing the one or more feeds, the feedback being generated in response to one or more gestures made with respect to the client machines of the users of the platform and where the feedback is tracked and made available to the client machines of the users of the platform to indicate user opinion with respect to individual pieces of artwork in the plurality of artwork of the plurality of pieces of artwork, maintain one or more virtual galleries for each user of the users of the platform, wherein the one or more galleries are of images of artwork from the one or more feeds, wherein each of the one or more virtual galleries are viewable by the client machines of the users of the platform, each of the one or more virtual galleries is associated with each user of the users of the platform containing images of artwork that said each user of the users of the platform liked while viewing the one or more feeds, tracking followers of the users of the platform;

provide each image of the images of artwork in each of the one or more virtual galleries associated with each user of the users of the platform along with information regarding the tracked feedback and tracked followers of said each image of the images of artwork in each of the one or more virtual galleries associated with each user of the users of the platform for display in a single user interface window via an application program running on the client machines of the users of the platform, wherein the client machines of the users of the platform are mobile devices, wherein the single user interface window includes graphical user interface elements that cause the platform to perform actions associated with said each image of the images of artwork in each of the one or more virtual galleries associated with each user of the users of the platform, the actions comprising collapse from view a section of the single user interface window containing the information regarding the tracked feedback and the tracked followers in response to an individual user of the users of the platform selecting a first graphical user interface element on the single user interface window, wherein the first graphical user interface element is displayed by one client machine of the client machines of the users of the platform concurrently with a first piece of artwork of a first virtual gallery of the one or more galleries;

receiving an indication from a first user wanting to bid on the first piece of artwork being viewed as part of the first virtual gallery of the one or more galleries in response to the first user selecting a second graphical user interface element on the single user interface window, wherein the second graphical user interface element is displayed by the one client machine of the client machines of the users of the platform concurrently with the first piece of artwork of the first virtual gallery of the one or more galleries and the information regarding the tracked followers and the tracked feedback;

wirelessly transmit, via a wireless communication network, an electronic auction notification to each of a first set of client machines of users that have the first piece of artwork in at least one virtual gallery of the first set of client machines in response to the first user selecting the second graphical user interface element on the single user interface window, the electronic auction notification indicating an auction for the first piece of artwork is to occur; and perform, in response to the first user selecting the second graphical user interface element on the single user interface window, the auction for the first piece of artwork via the wireless communication network during which the information regarding the tracked feedback, the tracked followers, and virtual galleries associated with the first set of client machines of the users that have the first piece of artwork in the at least one virtual gallery of the first set of client machines are available to the first set of client machines for use during the auction, the performing including receiving one or more messages containing bids transmitted from client machines of the first set of client machines, generating and pushing a second notifications regarding the auction, including bid information, to the first set of client machines, and concluding the auction, including transferring funds via electronic transfer to a second user having the first virtual gallery in response to the auction concluding in a sale of the first piece of artwork due to the auction being started from the first virtual gallery.

20. The system defined in claim 19 wherein the operations further comprise:

generating a bid notification message that comprises a user interface element configured to enable the client machines of the users of the platform of the user to send an auction-related message associated with the auction; and transmitting the bid notification message to the client machines of the client machines of the users of the platform;

establishing an electronic connection with the client machines of the users of the platform in response to receiving auction-related messages from the client machines of the users of the platform, the auction-related messages creating events, and filtering a plurality of events related to the auction to obtain a filtered event that includes the highest received bid in the auction, the filtered event being pushed for display on the client machines of the users of the platform via the electronic connection before an end of the auction, the pushing of the filtered event causing a display on the client machines of the users of the platform notifying the users of the platform of the highest received bid in the auction.

21. The system defined in claim 19 wherein each piece of the plurality of pieces of artwork comprises an image of a painting.

22. The system defined in claim 19 wherein the user opinion is an indication of a like or dislike of each of the individual pieces of artwork of the plurality of pieces of artwork, and wherein the one or more gestures are a swiping of the individual pieces of artwork of the plurality of pieces of artwork in one of two directions, the two directions indicating the like or dislike of each of the individual pieces of artwork of the plurality of pieces of artwork.

23. The system defined in claim 19 wherein the operations further comprise performing the electronic funds transfer to deposit a percentage of the price of the first piece of artwork to secure a timed right to exclusion to purchase the first piece of artwork.

24. The system defined in claim 20 wherein the operations further comprise performing a first electronic fund transfer to the artist of the first piece of artwork to pay the artist, paying the artist a percentage of a final auction price of the artwork and performing additional electronic fund transfers to pay the client machines in the first set of client machines that transmitted the one or more messages containing the bid information a commission based on a percentage of their bidding price point.

\* \* \* \* \*